(12) United States Patent
Kiribuchi

(10) Patent No.: US 10,591,889 B2
(45) Date of Patent: Mar. 17, 2020

(54) ENCODER AND SERVO SYSTEM

(71) Applicant: OMRON Corporation, Kyoto-shi, Kyoto (JP)

(72) Inventor: Takeshi Kiribuchi, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 92 days.

(21) Appl. No.: 15/035,767

(22) PCT Filed: Nov. 14, 2014

(86) PCT No.: PCT/JP2014/080277
§ 371 (c)(1),
(2) Date: May 11, 2016

(87) PCT Pub. No.: WO2015/072557
PCT Pub. Date: May 21, 2015

(65) Prior Publication Data
US 2016/0266568 A1 Sep. 15, 2016

(30) Foreign Application Priority Data
Nov. 14, 2013 (JP) .................................. 2013-235913

(51) Int. Cl.
*G05D 3/12* (2006.01)
*G01D 5/244* (2006.01)
(Continued)

(52) U.S. Cl.
CPC ............ *G05B 19/311* (2013.01); *H02K 11/21* (2016.01); *H02K 11/33* (2016.01); *G05B 2219/33218* (2013.01)

(58) Field of Classification Search
CPC ... G01D 5/24452; G05D 3/125; G05B 19/311
(Continued)

(56) References Cited

U.S. PATENT DOCUMENTS 5,525,885 A * 6/1996 Sato .................. G01D 5/24452
318/560
2004/0051486 A1 * 3/2004 Cheng .................... G05D 3/125
318/114
(Continued)

FOREIGN PATENT DOCUMENTS

CN 1514207 A 7/2004
CN 101236436 A 8/2008
(Continued)

OTHER PUBLICATIONS

The extended European search report dated Jun. 8, 2017 in the counterpart European patent application.
(Continued)

*Primary Examiner* — Bickey Dhakal
*Assistant Examiner* — Cortez M Cook
(74) *Attorney, Agent, or Firm* — Metrolex IP Law Group, PLLC

(57) ABSTRACT

The present invention provides a configuration which enables an improvement in the workability of wiring of a sensor in a servo system. An encoder detects the operation of a motor driven by a servo driver, and generates a feedback signal indicating the detected operation. Further, the encoder receives detected signals output from sensors for detecting an object driven by the motor via sensor cables. The encoder outputs the feedback signal and the input detected signals to the outside.

5 Claims, 17 Drawing Sheets

(51) Int. Cl.
*G05B 19/31* (2006.01)
*H02K 11/21* (2016.01)
*H02K 11/33* (2016.01)

(58) Field of Classification Search
USPC .......................................................... 318/560
See application file for complete search history.

(56) References Cited

U.S. PATENT DOCUMENTS

2006/0113947 A1   6/2006   Taniguchi et al.
2008/0180052 A1   7/2008   Iwashita et al.

FOREIGN PATENT DOCUMENTS

| | | |
|---|---|---|
| CN | 103292837 A | 9/2013 |
| JP | H11-170122 A | 6/1999 |
| JP | 2002-215244 A | 7/2002 |
| JP | 2010-067036 A | 3/2010 |

OTHER PUBLICATIONS

The Chinese Office Action dated Feb. 9, 2018 in a counterpart Chinese Patent application.

* cited by examiner

ENCODER AND SERVO SYSTEM

TECHNICAL FIELD

The present invention relates to an encoder and a servo system.

BACKGROUND ART

A servo system generally has a motor, a servo amplifier, and a controller. For example, a servo system disclosed in Japanese Unexamined Patent Publication No. 2010-67036 (Patent Document 1) includes a high-order master (controller) and a plurality of servo amplifiers. An external sensor (for example, a temperature sensor) is connected to one of the plurality of servo amplifiers, by a cable.

PRIOR ART DOCUMENT

Patent Document

Patent Document 1: Japanese Unexamined Patent Publication No. 2010-67036

SUMMARY OF THE INVENTION

Problem to be Solved by the Invention

In a place where a servo system is used, a servo driver is sometimes remote from a servo motor for reasons of layout. In such a case, a relatively long cable is necessary for connecting between the servo driver and the servo motor.

A sensor for detecting the movement of an object to be driven by the motor (for example, an object to be processed) must be arranged near the object. That is, the sensor is installed near the motor.

Therefore, when a distance between the motor and the servo driver is large, the cable for connecting between the sensor and the servo driver is also long. When the cable for connecting between the sensor and the servo driver is long, there occurs a problem that a cable wiring work (for example, cable connection or routing) requires much time and labor.

An object of the present invention is to provide a configuration capable of improving workability of sensor wiring in a servo system.

Means for Solving the Problem

An encoder according to an aspect of the present invention includes a signal generator that detects an operation of a motor driven by a servo driver and generates a feedback signal indicating the detected operation, an input unit that receives, via a sensor cable, a detected signal output from a sensor which detects an object driven by the motor, and a communication unit that outputs to an outside the feedback signal generated by the signal generator and the detected signal input to the input unit.

Preferably, the communication unit has an output terminal for transmitting the feedback signal and the detected signal by a common communication cable.

Preferably, the encoder further includes a power terminal which is connectable to an electric device through a cable, and is for supplying power to the electric device through the cable.

Preferably, the encoder further includes a control terminal which is connectable to an electric device through a cable, and is for outputting a control signal for controlling the electric device to the electric device through the cable.

Preferably, the encoder has an operation mode in which a plurality of servo drivers can communicate with each other. The communication unit transmits, in the operation mode, information indicating a servo driver corresponding to a destination of the detected signal.

A servo system according to another aspect of the present invention includes any one of the above encoders, a motor, a servo driver for driving the motor, a sensor that detects an object driven by the motor, and a sensor cable for transmitting to the encoder a detected signal from the sensor.

A servo system according to still another aspect of the present invention includes first and second motors, first and second servo drivers that drive the first and second motors, respectively, first and second sensors allocated to the first and second motors, respectively, detect objects driven by the allocated motors, and output the detected signals, a first encoder that transmits to the first servo driver a feedback signal indicating an operation of the first motor, and receives the detected signal from the first sensor or the second sensor via a sensor cable, and a second encoder that transmits to the second servo driver a feedback signal indicating an operation of the second motor, and receives the detected signal from the first sensor or the second sensor via a sensor cable. When each of the first and second encoders has received a detected signal from a sensor allocated to a servo driver that drives the motor of which an operation is detected by the encoder, the encoder transmits the detected signal, and transmits, together with or independently of the detected signal, the information indicating the servo driver corresponding to a destination of the detected signal. When each of the first and second encoders has received a detected signal from a sensor allocated to a different servo driver, the encoder transmits the detected signal, and transmits, together with or independently of the detected signal, the information indicating the different servo driver corresponding to a destination of the detected signal. Each of the first and second servo drivers determines, based on the information of the encoder connected to each of the servo drivers, whether the servo driver should process the detected signal or transfer the detected signal to the servo driver different from the servo driver.

Preferably, each of the first and second servo drivers determines, based on information indicating a servo driver corresponding to a destination of the detected signal, whether the servo driver should process the detected signal or transfer the detected signal to the different servo driver.

Preferably, each of the first and second servo drivers receives the information indicating the corresponding servo driver, and the detected signal, and determines whether the servo driver should process the detected signal or transfer the detected signal to the different servo driver.

Preferably, when each of the first and second encoders has received a detected signal from a sensor allocated to a servo driver that drives the motor of which an operation is detected by the encoder, the encoder generates the information for making the servo driver correspond to the destination, and when each of the first and second encoders has received a detected signal from a sensor allocated to a different servo driver, the encoder generates the information for making the different servo driver correspond to a destination, and transmits the information to the corresponding servo driver.

Preferably, when each of the first and second servo drivers has received a detected signal from a sensor allocated to a servo driver different from the servo driver, the servo driver generates the information for making the different servo driver correspond to the destination, and transmits the detected signal and the information.

Preferably, the servo system has an information recording unit in which the information is recorded in advance. Each of the first and second servo drivers determines, based on the information recorded in the information recording unit, whether the servo driver should process the detected signal or transfer the detected signal to the different servo driver.

Preferably, each of the first and second servo drivers has the information recording unit. The information recorded in the information recording unit is common between the first and second servo drivers, and is for specifying the destination of each of the detected signals.

Preferably, each of the first and second servo drivers has the information recording unit in which recorded in advance is the information indicating that the destination of the detected signal is the servo driver, and when the servo driver has received the detected signal not corresponding to the destination indicated by the information, the servo driver transfers the detected signal to the different servo driver.

Preferably, the servo system further includes a monitoring device that monitors the first and second servo drivers. When each of the first and second servo drivers has received a detected signal from a sensor allocated to the servo driver, the monitoring device controls the servo driver so that the servo driver processes the detected signal, and when each of the first and second servo drivers has received a detected signal from a sensor allocated to a servo driver different from the servo driver, the monitoring device controls the servo driver so that the servo driver transfers the detected signal to the different servo driver.

Preferably, the servo system further includes a monitoring device that monitors the first and second servo drivers. The monitoring device determines a servo driver that should process the detected signal, and generates the information for making the determined servo driver correspond to the destination.

Preferably, when each of the first and second servo drivers has received a detected signal, the monitoring device transmits the information indicating the corresponding servo driver to the servo drivers that have received the detected signals.

Preferably, the information indicating the servo driver corresponding to the destination of the detected signal is given to the detected signal.

Preferably, the detected signal and the information indicating the servo driver corresponding to the destination of the detected signal are transmitted continuously.

Preferably, the detected signal and the information indicating the servo driver corresponding to the destination of the detected signal are transmitted with a time interval.

Preferably, at least one of the first and second encoders is connectable to an electric device through a cable, and supplies power to the electric device through the cable.

Preferably, at least one of the first and second encoders is connectable to an electric device through a cable, and outputs a control signal for controlling the electric device to the electric device through the cable.

Effects of the Invention

According to the present invention, in the servo system, workability of sensor wiring can be improved. In addition, complexity of the wiring work can be reduced. Further, the cost required for cables and the cost required for the wiring work can be reduced.

MODES FOR CARRYING OUT THE INVENTION

Figure 1:
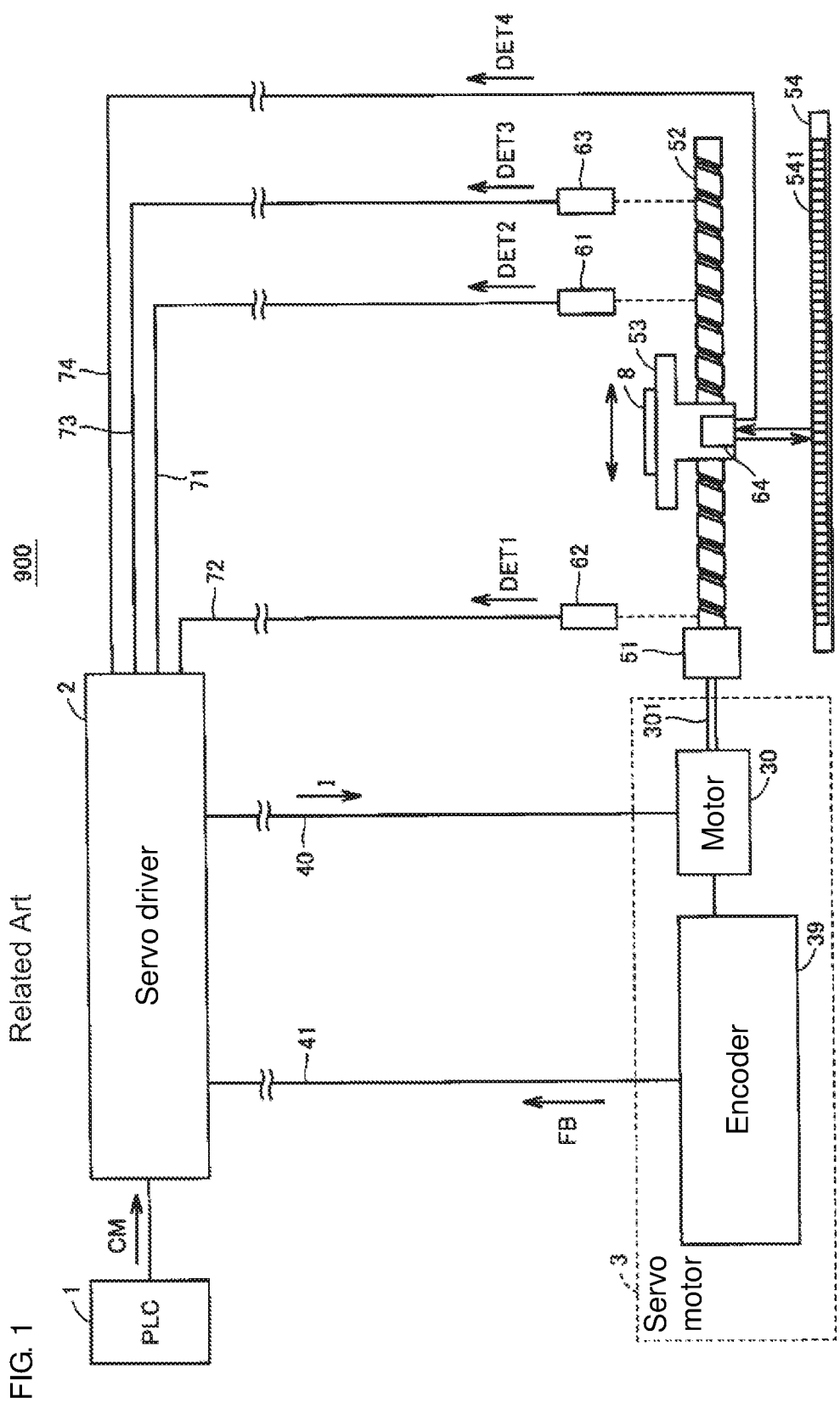
FIG. 1 is a block diagram schematically illustrating a configuration example of a general servo system.

Embodiments of the present invention will be described in detail below with reference to the drawings. In the drawings, the same or corresponding portions will be denoted by the same symbols, and the description will not be repeated.

Hereinafter, an industrial system will be described as an example of a servo system. However, the usage of the servo system according to the present invention is not particularly limited.

[General Configuration]

FIG. 1 is a block diagram schematically illustrating a configuration example of a general servo system. Referring to FIG. 1, a servo system 900 includes a PLC (Programmable Logic Controller) 1, a servo driver 2, a servo motor 3, a coupling 51, a threaded shaft 52, a precision stage 53, a linear scale 54, an origin sensor 61, limit sensors 62 and 63, and a full-closed sensor 64.

The PLC 1 outputs a command signal CM to the servo driver 2. The PLC 1 functions as a monitoring device of the servo driver 2, for example, by executing a process in accordance with a program prepared in advance.

The servo driver 2 receives the command signal CM from the PLC 1. Further, the servo driver 2 receives a feedback signal FB from the servo motor 3, and receives detected signals (DET1 to DET4) that are output from the origin sensor 61, the limit sensors 62 and 63, and the full-closed sensor 64. The servo driver 2 drives the servo motor 3 in accordance with these signals. More specifically, the servo driver 2 controls a drive current I of the servo motor 3.

The servo motor 3 includes a motor 30 and an encoder 39. The motor 30 is an AC servo motor, for example. The motor 30 receives, via a power supply cable 40, the drive current I from the servo driver 2. The encoder 39 detects the operation of the motor 30. The encoder 39 outputs the feedback signal FB indicating the detected operation to the servo driver 2 via an encoder cable 41.

The coupling 51 couples a rotation axis 301 of the motor 30 with the threaded shaft 52. The precision stage 53 moves in the axial direction (indicated by a double-headed arrow in FIG. 1) of the threaded shaft 52, in accordance with a rotation of the rotation axis 301 of the motor 30. That is, the precision stage 53 is an object driven by the motor 30. A movement amount and a moving direction of the precision stage 53 are controlled based on a rotation number and a rotation direction of the motor 30. As illustrated in FIG. 1, a workpiece 8 is mounted on the precision stage 53.

The origin sensor 61 and the limit sensors 62 and 63 are installed along the threaded shaft 52, in order to detect a position of the precision stage 53. The origin sensor 61 and the limit sensors 62 and 63 output detected signals DET1 to DET3 indicating that the precision stage 53 is detected.

For example, the origin sensor 61 and the limit sensors 62 and 63 are the sensors that indicate presence of the precision stage 53 by ON/OFF. For such sensors, there can be used photoelectric sensors, proximity sensors, fiber sensors, and the like. A position of the precision stage 53 when the origin sensor 61 is turned ON corresponds to the origin of the precision stage 53. The position of the precision stage 53 when the limit sensors 62 and 63 are turned ON corresponds to both ends of a movable range of the precision stage 53. For example, when the limit sensor 62 or the limit sensor 63 is turned ON, the precision stage 53 may stop following the stop of the motor 30.

For the origin sensor 61 and the limit sensors 62 and 63, image sensors may be used. In this case, the detected signals DET1 to DET3 are image signals.

The linear scale 54 is installed along the axial direction of the threaded shaft 52. The linear scale 54 is a reflective photoelectric glass scale, and is provided with equal-pitch slits 541, for example.

The full-closed sensor 64 is installed in the precision stage 53, and moves integrally with the precision stage 53. The full-closed sensor 64 has a light emitting unit and a light receiving unit (neither is illustrated). Light emitted from the light emitting unit is reflected by the slits 541 of the linear scale 54, and generates interference fringes on the light receiving unit. When the precision stage 53 moves, the interference fringes also move. Therefore, the intensity of the output signal from the light receiving unit changes in accordance with the movement of the precision stage 53. Therefore, by monitoring the intensity change of the output signal, the movement amount of the precision stage 53 can be acquired. The full-closed sensor 64 outputs the detected signal DET4 for calculating the movement amount of the precision stage 53.

The detected signals DET1 to DET4 are transmitted to the servo driver 2 via cables 71 to 74, respectively. The cables 71 to 74 are sensor cables for connecting between each sensor and the servo driver 2. However, the sensor cable may be a cable for connecting between the sensor and the PLC 1.

There are installed near the motor 30, the encoder 39 for detecting a movement of the motor 30, and the sensors (the origin sensor 61, the limit sensors 62 and 63, and the full-closed sensor 64) for detecting a movement of the object (the precision stage 53 in the example of FIG. 1) driven by the motor 30.

On the other hand, the servo driver 2 can perform remote control of the motor 30, by receiving the command from the PLC 1 and signals from the encoder 39 and each sensor. Therefore, the servo driver 2 does not need to be installed near the motor 30. Accordingly, the servo driver 2 is sometimes installed with a distance from the servo motor 3.

For example, because of, for example, the layout at the installation position, the distance between the servo driver 2 and the servo motor 3 can be long. Therefore, the power supply cable 40 and the encoder cable 41 can also be long. Accordingly, power supply cables 40 and encoder cables 41 having lengths of 3 m, 5 m, 10 m, . . . , and 100 m, for example, are prepared.

When the distance between the servo driver 2 and the servo motor 3 is long, the cables 71 to 74 for connecting between each sensor and the servo driver 2 are also long. When the cables for connecting between each sensor and the servo driver 2 are long, a cable connection or wiring work requires time and labor. That is, complexity of the wiring work increases. Further, when long cables are used, the cost required for the cables increases, and the cost associated with the wiring work also increases. This problem is more remarkable when more sensors are used.

According to the embodiments of the present invention, even when a distance between the servo driver 2 and the servo motor 3 is long, the increase in the length of the sensor wiring can be avoided. Hereinafter, the embodiments will be described in detail.

[First Embodiment]

Figure 2:
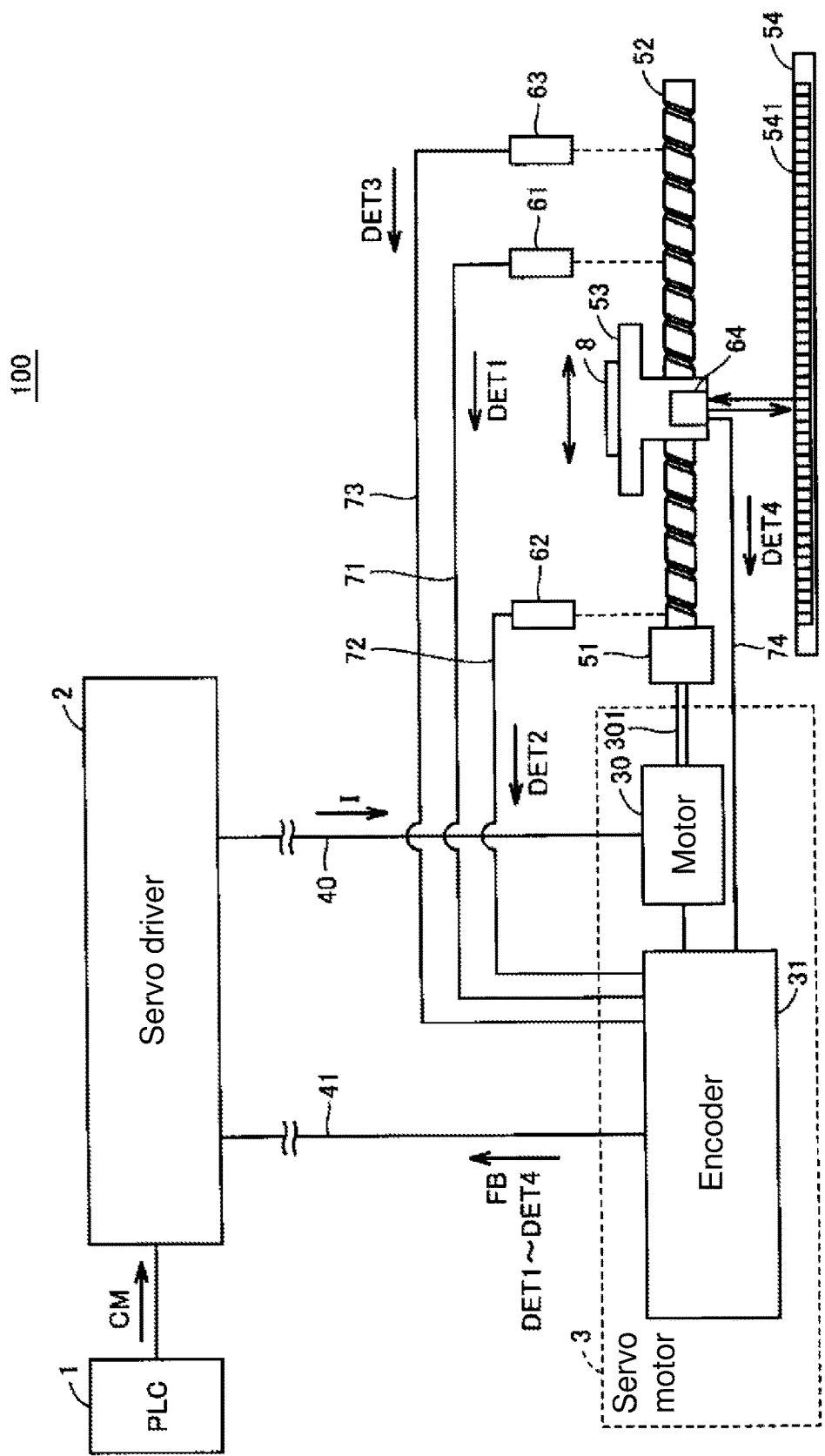
FIG. 2 is a block diagram schematically illustrating a configuration of a servo system according to a first embodiment of the present invention.

FIG. 2 is a block diagram schematically illustrating a configuration of a servo system according to a first embodiment of the present invention. Referring to FIG. 1 and FIG. 2, the servo system according to the first embodiment of the present invention includes an encoder 31 instead of the encoder 39.

In the embodiment, the origin sensor 61, the limit sensors 62 and 63, and the full-closed sensor 64 are connected to the encoder 31 by the cables 71, 72, 73, and 74, respectively. The encoder 31 receives the detected signals DET1 to DET4. The encoder 31 transmits the detected signals DET1 to DET4 to the servo driver 2 through the encoder cable 41.

Because other configurations of the servo system 100 are similar to corresponding configurations of the servo system 900, a detailed description will not be repeated.

Figure 3:
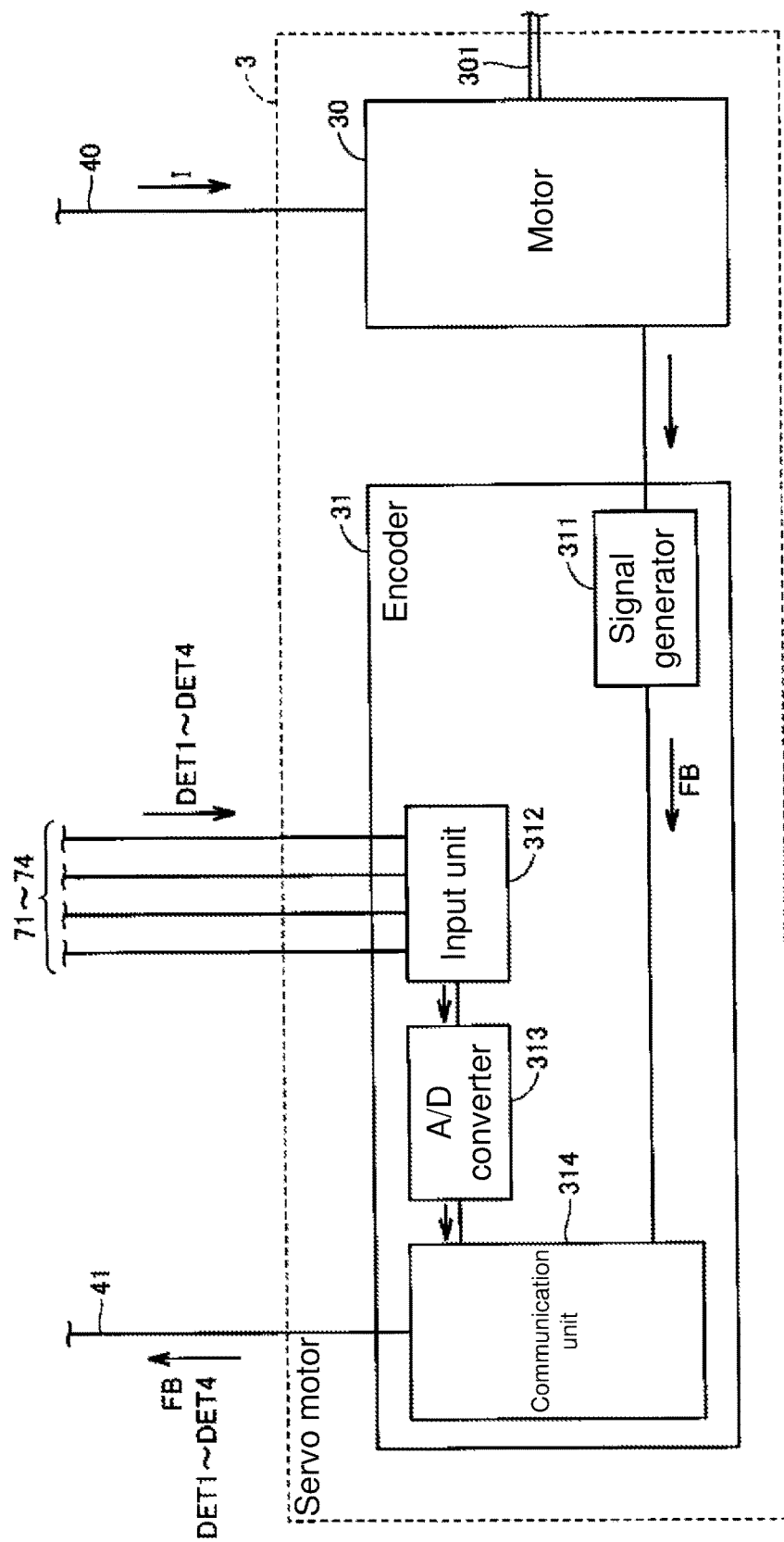
FIG. 3 is a block diagram schematically illustrating a configuration of an encoder 31 illustrated in FIG. 2.

FIG. 3 is a block diagram schematically illustrating a configuration of the encoder 31 illustrated in FIG. 2. Referring to FIG. 3, the encoder 31 includes a signal generator 311, an input unit 312, an A/D (analog-digital) converter 313, and a communication unit 314.

The signal generator 311 detects the operation of the motor 30 driven by the servo driver 2, and generates the feedback signal FB indicating the detected operation of the motor 30. The feedback signal FB is output to the communication unit 314.

The feedback signal FB contains the information concerning a rotational position (an angle) of the rotation axis 301 of the motor 30, the information concerning a rotation speed of the rotation axis 301, and the information concerning a rotation direction of the rotation axis 301, for example.

For the configuration of the signal generator 311, a known configuration of an incremental type or an absolute type can be applied. Therefore, a detailed description will not be repeated.

The input unit 312 is connected to the cables 71 to 74. The input unit 312 is a terminal block or a connector for connecting a wire, for example. The input unit 312 receives the detected signals DET1 to DET4 from each sensor (refer to FIG. 2), via the cables 71 to 74. That is, the input unit 312 functions as an input interface for the encoder 31 to receive the detected signals DET1 to DET4. The detected signals DET1 to DET4 are output from the input unit 312 to the A/D converter 313.

The A/D converter 313 A/D converts the detected signals DET1 to DET4 from the input unit 312, and outputs the converted digital signals to the communication unit 314.

The communication unit 314 is an interface for communicating with the servo driver 2. In the embodiment, the communication unit 314 transmits the feedback signal FB and the detected signals DET1 to DET4 to the servo driver 2 via the encoder cable 41.

In the embodiment, serial communication is applied to transmission of the feedback signal FB and the detected signals DET1 to DET4 from the communication unit 314. Accordingly, the number of signal lines included in the cable can be decreased. For the serial communication by the encoder cable 41, for example, a known communication standard of RS-232C (Recommended Standards 232), RS-422, or RS-485 can be employed.

The RS-232C, RS-422, and RS-485 are the standards for supporting communications over a long distance (a maximum of 15 m in the RS-232C, and a maximum of 1.2 km in the RS-422 and RS-485, in the communication standards). Therefore, by employing these communication standards in the embodiment, signals can be transmitted stably even when the distance between the servo driver and the servo motor is large.

Figure 4:
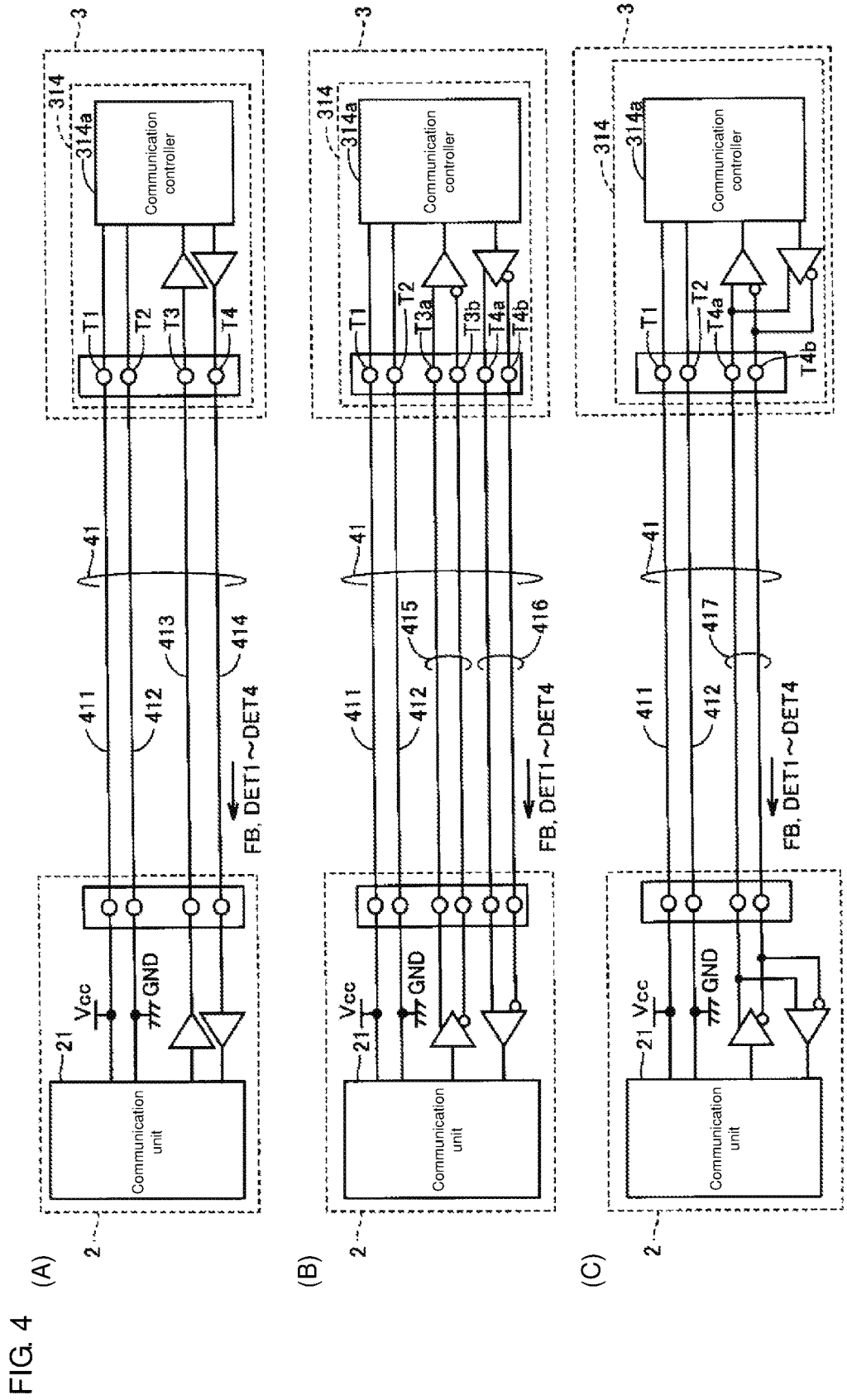
FIG. 4 illustrates configuration examples of an encoder cable 41 illustrated in FIG. 2.

FIG. 4 illustrates configuration examples (A) to (C) of the encoder cable 41 illustrated in FIG. 2. FIG. 4(A) illustrates a configuration of the encoder cable 41 based on the RS-232C. FIG. 4(B) illustrates a configuration of the encoder cable 41 based on the RS-422. FIG. 4(C) illustrates a configuration of the encoder cable 41 based on the RS-485.

The RS-232C is a serial communication standard of the full-duplex communication system. As illustrated in FIG. 4(A), the encoder cable 41 includes a power supply line 411 for applying a power supply voltage Vcc, a ground line 412 for applying a ground potential GND, and two data transmission lines 413 and 414.

In the servo motor 3, the communication unit 314 has terminals T1 to T4 that are electrically connected to a communication controller 314a, the power supply line 411, the ground line 412, and the data transmission lines 413 and 414, respectively. The communication controller 314a is realized as an IC (Integrated Circuit), for example. The communication controller 314a outputs the feedback signal FB and the detected signals DET1 to DET4 via the terminal T4. That is, the terminal T4 is an output terminal for transmitting the feedback signal FB and the detected signals DET1 to DET4 by a common communication cable (the encoder cable 41).

The feedback signal FB and the detected signals DET1 to DET4 that are output to the terminal T4 are transmitted through the transmission line 414. A communication unit 21 of the servo driver 2 receives these signals.

The RS-422 is a serial communication standard of the full-duplex communication system or the half-duplex communication system. In the case of the full-duplex communication, as illustrated in FIG. 4(B), the encoder cable 41 includes the power supply line 411, the ground line 412, and data transmission lines 415 and 416 as a pair of data transmission lines each for transmitting a differential signal. In the above configuration of the encoder cable 41, the communication unit 314 of the encoder 31 has terminals T3a and T3b that are electrically connected to the data transmission line 415, and terminals T4a and T4b that are electrically connected to the data transmission line 416, instead of the terminals T3 and T4. The terminals T4a and T4b are output terminals for transmitting the feedback signal FB and the detected signals DET1 to DET4 by a common communication cable (the encoder cable 41).

The RS-485 is a serial communication standard of the full-duplex communication system or the half-duplex communication system. For example, in the case of the half-duplex communication, as illustrated in FIG. 4(C), the encoder cable 41 includes the power supply line 411, the ground line 412, and a pair of data transmission lines 417 for transmitting a differential signal. In the above configuration of the encoder cable 41, the communication unit 314 of the encoder 31 has the terminals T4a and T4b that are electrically connected to the data transmission line 417. Similarly to the configuration illustrated in FIG. 4(B), the terminals T4a and T4b are output terminals for transmitting the feedback signal FB and the detected signals DET1 to DET4 by a common communication cable (the encoder cable 41).

According to the embodiment, the cables 71 to 74 are connected to the encoder 31. The encoder 31 and each sensor are arranged near the motor 30. Therefore, shorter cables can be used for the cables 71 to 74. Therefore, the sensor wiring work can be facilitated. That is, complexity of the wiring work can be reduced. Further, the cost required for cables and the cost required for the wiring work can be reduced. The expression "near the motor 30" encompasses a position at which a distance from the motor 30 is shorter than a distance from the servo driver 2.

Further, there is a case where the detected signals DET1 to DET4 transmitted through the cables 71 to 74 are analog signals. According to the embodiment, because the cables 71 to 74 can be made shorter than those in the configuration illustrated in FIG. 1, the influence of electromagnetic noise on the detected signals DET1 to DET4 transmitted through the cables 71 to 74 can be reduced. Accordingly, reliability of the servo system can be enhanced.

[Second Embodiment]

Figure 5:
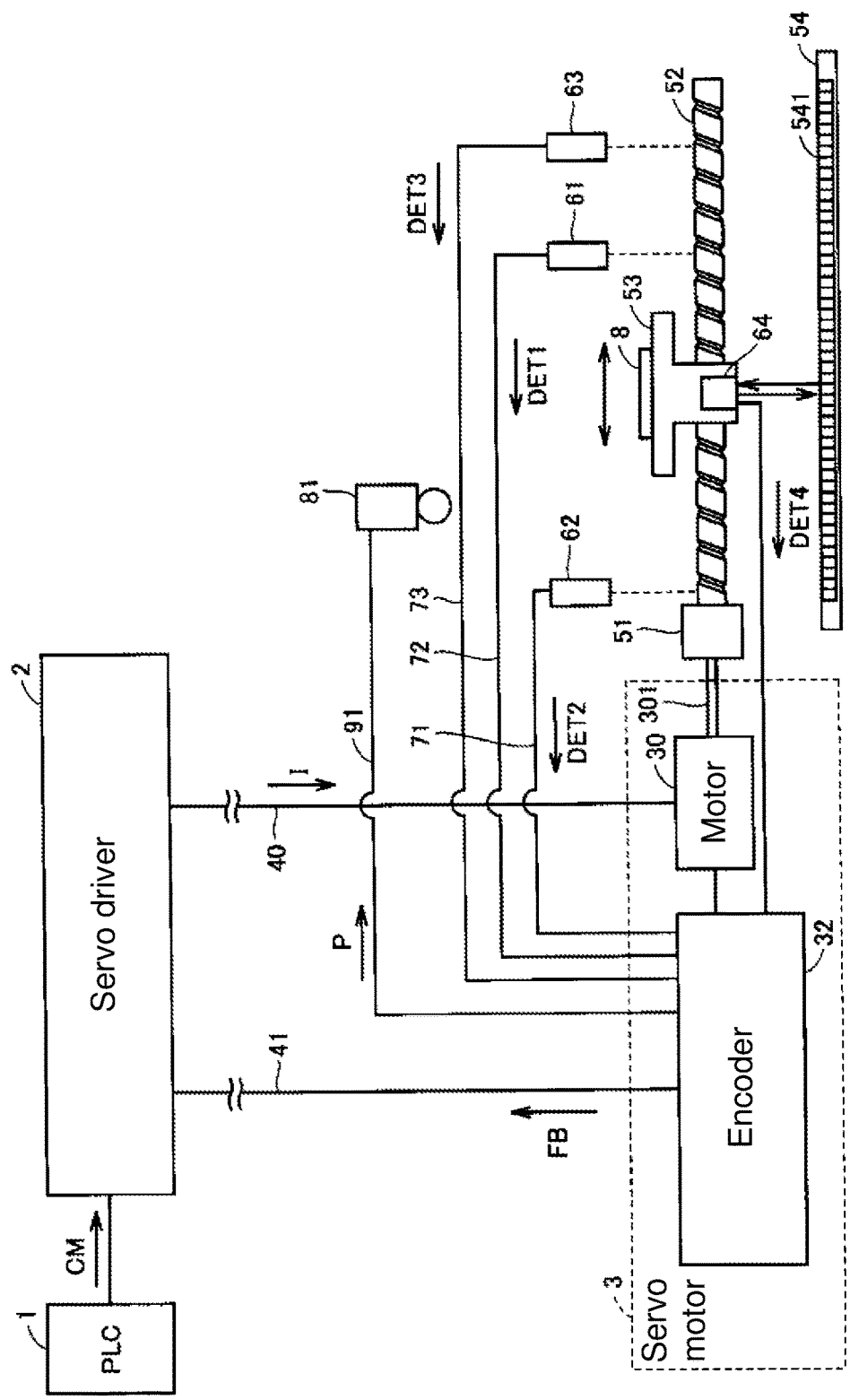
FIG. 5 is a block diagram schematically illustrating a configuration of a servo system according to a second embodiment of the present invention.

FIG. 5 is a block diagram schematically illustrating a configuration of a servo system according to a second embodiment of the present invention. Referring to FIG. 2 and FIG. 5, a servo system 200 is different from the servo system 100 in that the servo system 200 further includes lighting equipment 81, and includes an encoder 32 instead of the encoder 31. FIG. 5 illustrates the lighting equipment 81 as an example of realizing the electric device connected to the encoder 32 through a cable 91.

Figure 6:
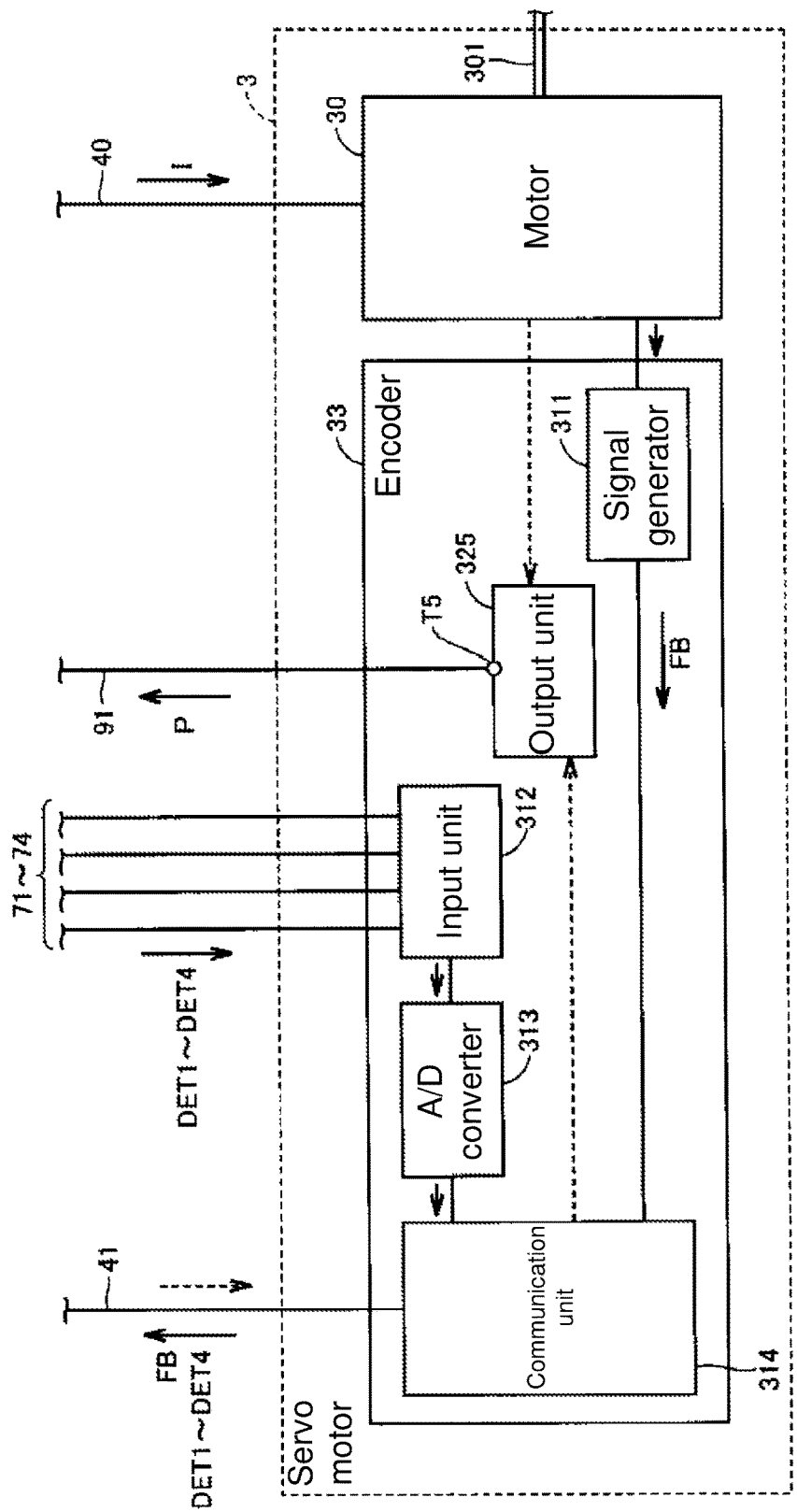
FIG. 6 is a block diagram schematically illustrating a configuration of an encoder 32 illustrated in FIG. 5.

FIG. 6 is a block diagram schematically illustrating a configuration of the encoder 32 illustrated in FIG. 5. Referring to FIG. 3 and FIG. 6, the configuration of the encoder 32 is different from the configuration of the encoder 31 (refer to FIG. 3) in that the encoder 32 further includes an output unit 325.

The output unit 325 can be realized as a terminal block or a connector. The output unit 325 has a power terminal T5. The cable 91 is connected to the power terminal T5. That is, the power terminal T5 is connectable to the lighting equipment 81 through the cable 91. Power P is supplied from the power terminal T5 to the lighting equipment 81. The lighting equipment 81 receives the power P, and lights the precision stage 53. The power (indicated by a broken-line arrow) supplied from the encoder 32 to the lighting equipment 81 is a part of the power supplied from the servo driver 2 to the encoder 32 (or the motor 30), for example.

Further, because configurations of the servo system 200 and the encoder 32 other than the above configurations are similar to corresponding configurations of the servo system 100 (refer to FIG. 2) and the encoder 31 (refer to FIG. 3), a detailed description will not be repeated.

The lighting equipment 81 is arranged near the object (the precision stage 53) which is driven by the motor 30. That is, the lighting equipment 81 is arranged near the motor 30. Similarly, the encoder 32 is also arranged near the motor 30. According to the embodiment, the lighting equipment 81 is connected to the encoder 32 via the cable 91. Therefore, it is possible to use a cable shorter than a cable necessary for connecting the lighting equipment 81 to the servo driver 2.

As described above, according to the second embodiment, the same effect as that of the first embodiment can be obtained. Further, according to the second embodiment, because the length of a cable connected to the electric device can be reduced, the wiring work of the electric device can also be facilitated.

The electric device that can be connected to the encoder 32 is not limited to the lighting equipment 81. A proper electric device can be selected based on the configuration of the servo system, the rating of the output current of the encoder 32, and the like. For example, a solenoid or the like used for the actuator can be connected to the encoder 32.

[Third Embodiment]

Figure 7:
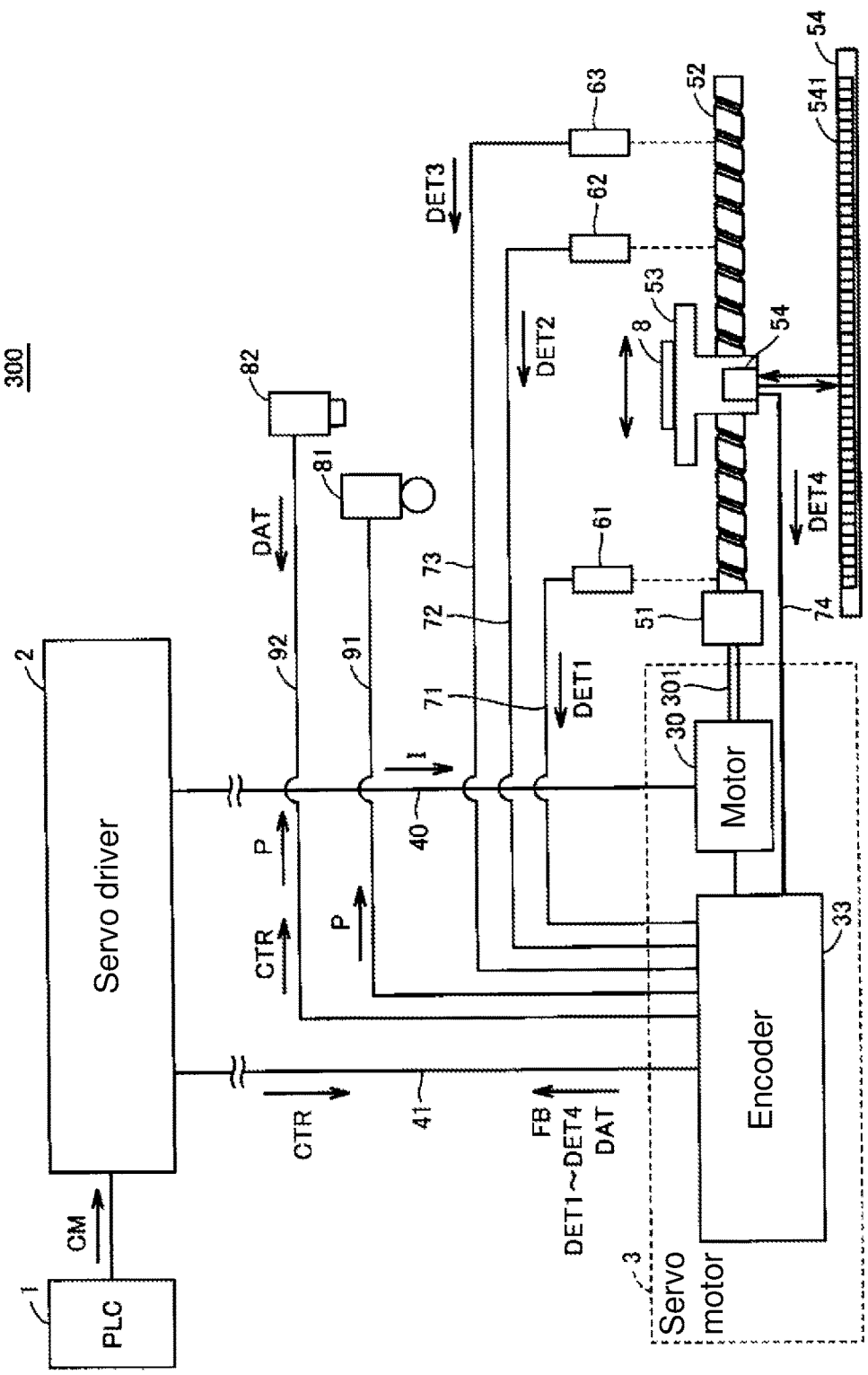
FIG. 7 is a block diagram schematically illustrating a configuration of a servo system according to a third embodiment of the present invention.

FIG. 7 is a block diagram schematically illustrating a configuration of a servo system according to a third embodiment of the present invention. Referring to FIG. 5 and FIG. 7, a servo system 300 is different from the servo system 200 in that the servo system 300 further includes an imaging device 82, and includes an encoder 33 instead of the encoder 32. FIG. 5 illustrates the lighting equipment 81 and the imaging device 82 as an example of realizing the electric device connected to the encoder 32 through the cable 91.

Figure 8:
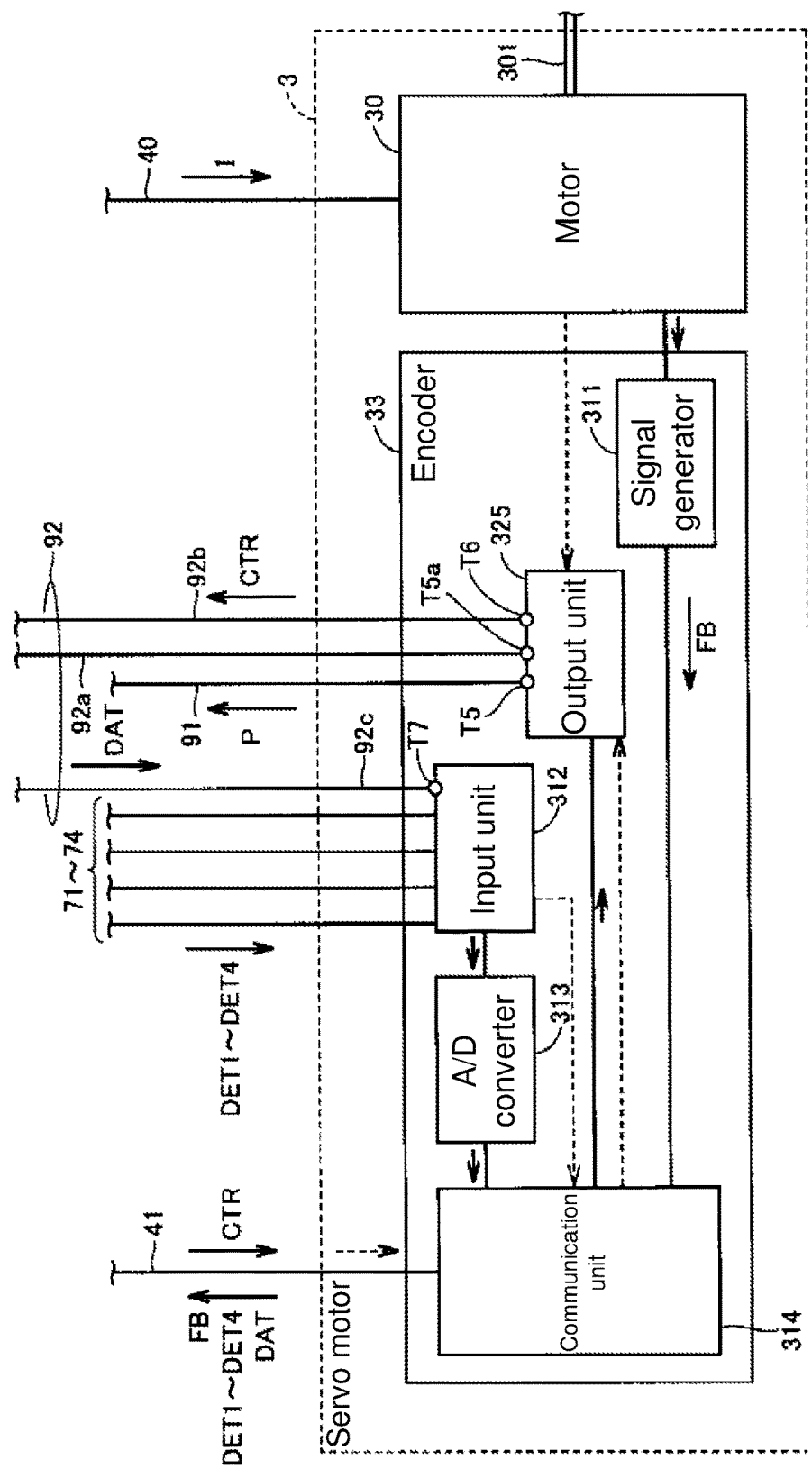
FIG. 8 is a block diagram schematically illustrating a configuration of an encoder 33 illustrated in FIG. 7.

FIG. 8 is a block diagram schematically illustrating a configuration of the encoder 33 illustrated in FIG. 7. Referring to FIG. 6 and FIG. 8, in the third embodiment, the output unit 325 has a power terminal T5a and a control terminal T6, in addition to the power terminal T5. Further, the input unit 312 has a data input terminal T7.

A cable 92 connected to the imaging device 82 includes a power line 92a, a control line 92b, and a data line 92c. The power line 92a is connected to the power terminal T5a. The control line 92b is connected to the control terminal T6. The data line 92c is connected to the data input terminal T7.

The servo driver 2 outputs a control signal CTR for controlling the imaging device 82. The control signal CTR is input to the communication unit 314 of the encoder 33 via the encoder cable 41. The communication unit 314 transmits the control signal CTR to the output unit 325.

The output unit 325 transmits power from the power terminal T5a to the imaging device 82 through the power line 92a. Further, the output unit 325 transmits the control signal CTR from the control terminal T6 to the imaging device 82 via the control line 92b. That is, the control terminal T6 is connectable to the imaging device 82 through the cable 92 (the control line 92b), and is for outputting the control signal CTR for controlling the imaging device 82 to the imaging device 82 through the cable 92.

The imaging device 82 images the workpiece 8 in accordance with the control signal CTR, and outputs image data as a data signal DAT. The data signal DAT is input to the input unit 312 through the data line 92c and the data input terminal T7. The input unit 312 transmits the data signal DAT to the communication unit 314. The communication unit 314 transmits the data signal DAT to the servo driver 2 via the encoder cable 41.

As described above, according to the third embodiment, the same effect as that of the first and second embodiments can be obtained. Particularly, according to the third embodiment, because the length of the cable connected to the electric device controlled by the servo driver 2 can be reduced, the wiring work of the electric device can also be facilitated.

[Fourth Embodiment]

Figure 9:
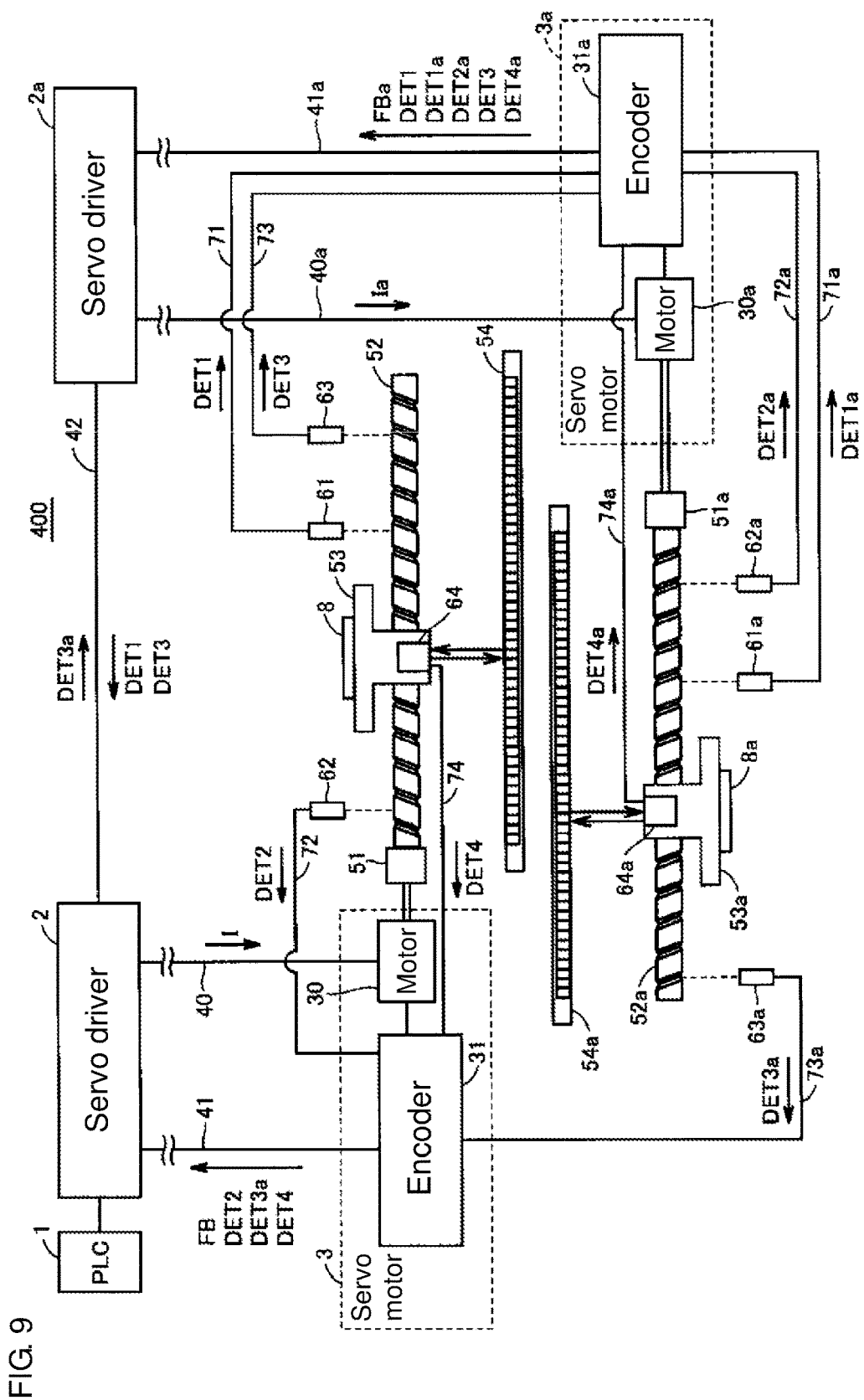
FIG. 9 is a block diagram schematically illustrating a configuration of a servo system according to a fourth embodiment of the present invention.

FIG. 9 is a block diagram schematically illustrating a configuration of a servo system according to a fourth embodiment of the present invention. Referring to FIG. 9, a servo system 400 includes the PLC 1, and a plurality of groups that are monitored by the PLC 1. Each group includes a servo driver, a servo motor allocated to the servo driver, a sensor, and an encoder. For the sake of illustration, FIG. 9 illustrates two groups. However, the number of the groups is not limited to two.

A configuration of each group is similar to the configuration according to the first embodiment (refer to FIG. 2). Therefore, the same or corresponding symbols are attached to structural elements that are the same or correspond to each other between the groups.

The origin sensor 61, the limit sensors 62 and 63, and the full-closed sensor 64 are allocated to the servo motor 3. On the other hand, an origin sensor 61a, limit sensors 62a and 63a, and a full-closed sensor 64a are allocated to a servo motor 3a.

In the embodiment illustrated in FIG. 9, a cable from each sensor is connected to an encoder nearer the sensor. In the first embodiment, a cable from each sensor is connected to an encoder that detects the operation of a motor which drives the object to be detected by the sensor. For example, the origin sensor 61 and the limit sensor 63 detect the precision stage 53 driven by the motor 30. Therefore, according to the configuration of the first embodiment, both the origin sensor 61 and the limit sensor 63 are connected to the encoder 31.

On the other hand, in the configuration illustrated in FIG. 9, the encoder 31a is arranged nearer the origin sensor 61 and the limit sensor 63 than the encoder 31 is. Therefore, in the embodiment, the cable 71 from the origin sensor 61 and the cable 73 from the limit sensor 63 are connected to the encoder 31a. Arranging a plurality of encoders realizes such a configuration.

Similarly, the limit sensor 63a detects a precision stage 53a driven by a motor 30a. Therefore, according to the configuration of the first embodiment, a cable 73a from the limit sensor 63a is connected to the encoder 31a. However, in the configuration illustrated in FIG. 9, the encoder 31 is arranged nearer the limit sensor 63a than the encoder 31a is.

Therefore, in the embodiment, the cable 73a from the limit sensor 63a is connected to the encoder 31.

For the rest of the sensors, each sensor can also be similarly connected to a nearer encoder out of the encoders 31 and 31a via a cable. However, in the configuration illustrated in FIG. 9, for the limit sensor 62, the full-closed sensor 64, the origin sensor 61a, the limit sensor 62a, and the full-closed sensor 64a, a nearer encoder coincides with the encoder that detects the operation of the motor which drives the object detected by the sensors.

More specifically, the limit sensor 62 and the full-closed sensor 64 detect the precision stage 53 (the object). The encoder 31 is arranged nearer these sensors than the encoder 31a is. The encoder 31 detects the operation of the motor 30 that drives the precision stage 53. That is, for the limit sensor 62 and the full-closed sensor 64, a nearer encoder coincides with the encoder that detects the operation of the motor which drives the object detected by the sensors. Therefore, the limit sensor 62 and the full-closed sensor 64 are connected to the encoder 31 via the cable 72 and the cable 74, respectively.

Similarly, the origin sensor 61a, the limit sensor 62a, and the full-closed sensor 64a detect the precision stage 53a (the object). The encoder 31a is arranged nearer these sensors than the encoder 31 is. The encoder 31a detects the operation of the motor 30a that drives the precision stage 53a. That is, for the origin sensor 61a, the limit sensor 62a, and the full-closed sensor 64a, a nearer encoder coincides with the encoder that detects the operation of the motor which drives the object detected by the sensors. Therefore, the origin sensor 61a, the limit sensor 62a, and the full-closed sensor 64a are connected to the encoder 31a via a cable 71a, a cable 72a, and a cable 74a, respectively.

The origin sensor 61, the limit sensors 62 and 63, and the full-closed sensor 64 output the detected signals DET1 to DET4, respectively. On the other hand, the origin sensor 61a, the limit sensors 62a and 63a, and the full-closed sensor 64a output detected signals DET1a to DET4a, respectively.

The encoders 31 and 31a have an operation mode in which a plurality of servo drivers 2 and 2a can communicate with each other. For example, each of the encoders 31 and 31a may receive a signal for setting the operation mode, through the encoder cable from the servo driver connected to the encoder.

In this operation mode, each of the encoders 31 and 31a transmits a detected signal, and transmits, together with or independently of the detected signal, the information indicating the servo driver corresponding to the destination of the detected signal (either of the servo drivers 2 and 2a).

Each of the detected signals DET1 to DET4, and DET1a to DET4a needs to reach a servo driver that requires the detected signal. The servo driver 2 and the servo driver 2a are connected to each other by a communication cable 42. Each of the servo drivers 2 and 2a transmits a detected signal from each encoder, to a servo driver requiring the detected signal, or the servo driver itself receives the detected signal, based on the information indicating the servo driver corresponding to the destination of each of the detected signals (either of the servo drivers 2 and 2a).

More specifically, the servo driver 2 receives the detected signals DET2, DET3a and DET4 from the encoder 31. While the detected signals DET2 and DET4 are the signals to be processed by the servo driver 2, the detected signal DET3a is the signal to be processed by the servo driver 2a. Therefore, the servo driver 2 transfers the detected signal DET3a to the servo driver 2a.

Similarly, the servo driver 2a receives the detected signals DET1, DET1a, DET2a, DET3, and DET4a from the encoder 31a. While the detected signals DET1a, DET2a, and DET4a are the signals to be processed by the servo driver 2a, the detected signals DET1 and DET3 are the signals to be processed by the servo driver 2. Therefore, the servo driver 2a transfers the detected signals DET1 and DET3 to the servo driver 2a.

In order to sort the detected signals between the servo drivers in this way, the detected signals need to be correlated with the information indicating the servo driver corresponding to the destination of the detected signals.

Figure 10:
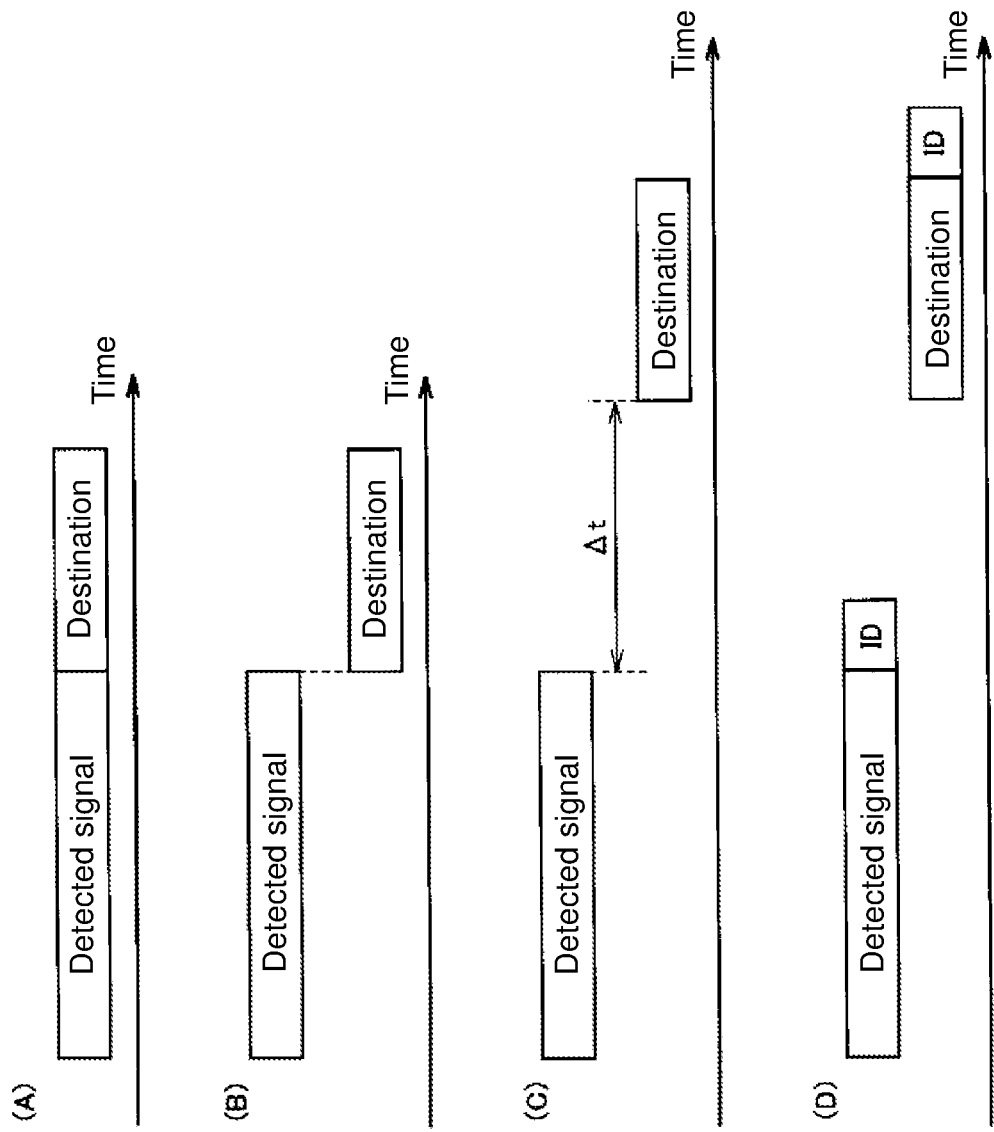
FIG. 10 illustrates diagrams for illustrating a relationship between a detected signal and the information indicating the servo driver corresponding to the destination of the detected signal.

FIG. 10 illustrates diagrams (A) to (D) for illustrating a relationship between a detected signal and the information indicating the servo driver corresponding to the destination of the detected signal. Referring to FIG. 10, a detected signal may be given the information indicating the servo driver corresponding to the destination of the detected signal (refer to FIG. 10(A)). When the detected signal and the information are correlated with each other, the detected signal and the information may be transmitted separately. In this case, the detected signal and the information may be transmitted continuously or may be transmitted with a time interval.

The case where the detected signal and the information are transmitted continuously will be described. Each of the servo drivers 2 and 2a continuously receives the detected signal and the information. Therefore, each of the servo drivers 2 and 2a can correlate the detected signal with the information (refer to FIG. 10(B)). The order of the detected signal and the information may be opposite.

Further, the case where the detected signal and the information are transmitted with a time interval will be described. The time interval Δt is determined in advance. Each of the servo drivers 2 and 2a receives a detected signal. Each of the servo drivers 2 and 2a receives the information after a lapse of the time interval Δt from the reception of the detected signal. That is, each servo driver receives the information at a constant timing (Δt) from the reception of the detected signal. Therefore, each of the servo drivers 2 and 2a can correlate the detected signal with the information (refer to FIG. 10(C)). Alternatively, each of the encoders 31 and 31a may give a common identification number (indicated by ID in the drawing) to the detected signal and the information. Each of the servo drivers 2 and 2a can correlate the detected signal with the information, based on the identification number (refer to FIG. 10(D)). The identification number may be a serial number, for example.

Figure 11:
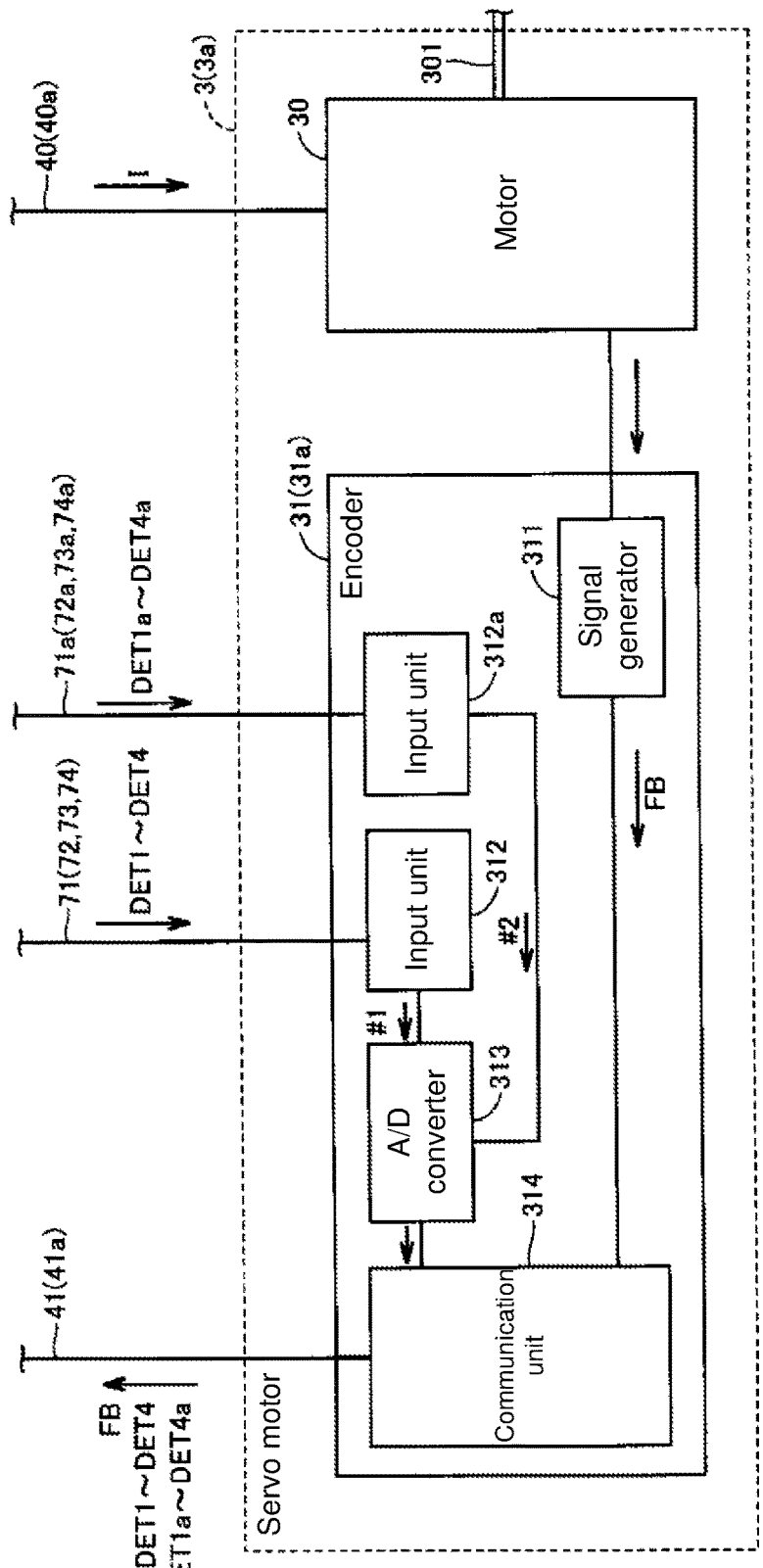
FIG. 11 is a block diagram schematically illustrating a configuration of encoders 31 and 31a illustrated in FIG. 9.
Figure 12:
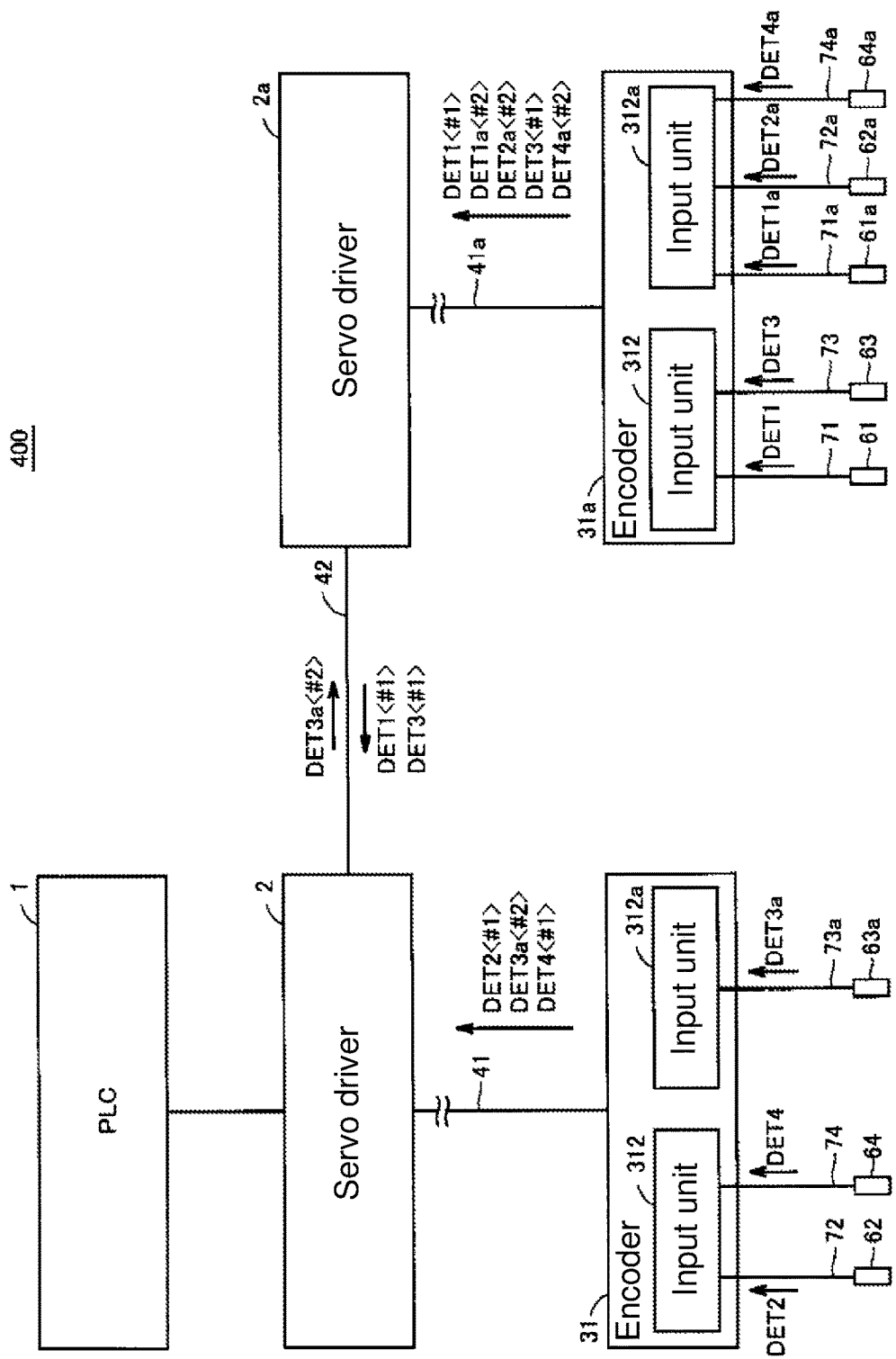
FIG. 12 illustrates structural elements relevant to sorting of detected signals in the servo system illustrated in FIG. 9.

FIG. 11 is a block diagram schematically illustrating configurations of the encoders 31 and 31a illustrated in FIG. 9. FIG. 12 illustrates structural elements relevant to sorting of detected signals in the servo system 400 illustrated in FIG. 9.

Referring to FIG. 11 and FIG. 12, the encoder 31 has two-system input units 312 and 312a. When a destination of the detected signal from the sensor is the servo driver 2 connected to the encoder, a cable from the sensor is connected to the input unit 312. On the other hand, when a destination of the detected signal from the sensor is the servo driver 2a, a cable from the sensor is connected to the input unit 312a.

Each of the input units 312 and 312a gives the information that identifies a destination, to the signal which is input from the sensor. To facilitate the understanding, as an example, the information given to the signal which is input to the input unit 312 is denoted by "#1," and the information given to the signal which is input to the input unit 312a is denoted by "#2." The information "#1" indicates a signal to be transmitted to the servo driver 2. On the other hand, "#2" indicates a signal to be transmitted to the servo driver 2a. In this way, the encoders 31 and 31a generate the information indicating the servo driver corresponding to the destination of the detected signal.

That is, when each of the encoders 31 and 31a has received a detected signal from a sensor allocated to a servo driver that drives the motor of which an operation is detected by the encoder, the encoder generates the information for making the servo driver correspond to the destination. On the other hand, when each of the encoders 31 and 31a has received a detected signal from a sensor allocated to a different servo driver, the encoder generates the information for making the different servo driver correspond to the destination, and transmits the information to the corresponding servo driver.

Each of the servo drivers 2 and 2a receives a detected signal from the corresponding encoder, and decides which one of "#1" and "#2" the information given to the detected signal is. When the information given to the servo driver 2 is "#1," the servo driver 2 processes this signal, and when the information given to the servo driver 2 is "#2," the servo driver 2 transfers this signal to the servo driver 2a. On the other hand, when the information given to the servo driver 2a is "#1," the servo driver 2a transfers this signal to the servo driver 2, and when the information given to the servo driver 2a is "#2," the servo driver 2a processes this signal.

That is, each servo driver determines, based on the information ("#1" or "#2") indicating a servo driver corresponding to a destination of the detected signal, whether the servo driver should process the detected signal or transfer the detected signal to the different servo driver.

As described above, according to the fourth embodiment, by connecting a cable from each sensor to a nearest encoder out of a plurality of encoders, a detected signal from the sensor can be transmitted to a servo driver that requires the detected signal. Accordingly, the wire connected to the sensor can be made much shorter.

[Fifth Embodiment]

A device (a servo driver or a PLC) at a higher order than the encoder may have the information indicating the servo driver corresponding to a destination of the detected signal. In a fifth embodiment, the servo driver generates the information.

Figure 13:
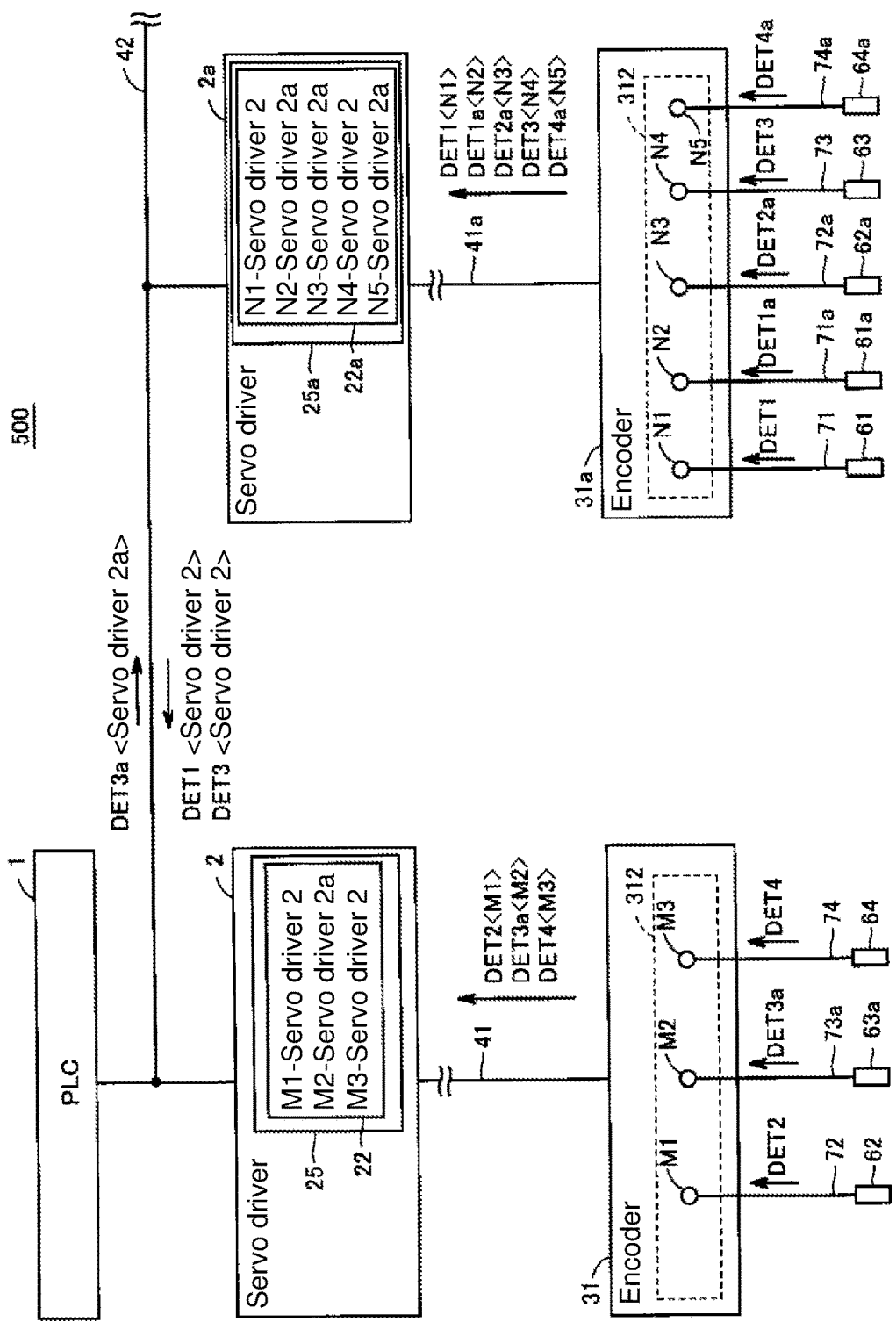
FIG. 13 illustrates structural elements relevant to sorting of detected signals in a servo system according to a fifth embodiment.

FIG. 13 illustrates structural elements relevant to sorting of detected signals in a servo system 500 according to a fifth embodiment. Because an overall configuration of the servo system 500 is similar to the overall configuration of the servo system 400 (refer to FIG. 9), a detailed description will not be repeated.

Referring to FIG. 13, the encoder 31 includes the input unit 312. The input unit 312 of the encoder 31 has input terminals M1 to M3 for inputting a detected signal. The cable 72 from the limit sensor 62 is connected to the input terminal M1. The cable 73a from the limit sensor 63a is connected to the input terminal M2. The cable 74 from the full-closed sensor 64 is connected to the input terminal M3.

Similarly, the encoder 31a includes the input unit 312. The input unit 312 of the encoder 31a has input terminals N1 to N5 for inputting a detected signal. The cable 71 from the origin sensor 61 is connected to the input terminal N1. The cable 71a from the origin sensor 61a is connected to the input terminal N2. The cable 72a from the limit sensor 62a is connected to the input terminal N3. The cable 73 from the limit sensor 63 is connected to the input terminal N4. The cable 74a from the full-closed sensor 64a is connected to the input terminal N5.

For each detected signal, the input unit 312 transmits, together with or independently of the detected signal, the information indicating the input terminal to which the detected signal is input. The information indicating that the detected signal is input to the input terminal M1 is expressed as <M1>. The input unit 312 gives the information <M1> to the detected signal DET2. The detected signal DET2 to which the information <M1> is given is expressed as DET2<M1>.

The servo drivers 2 and 2a include, for each input terminal, information recording units 25 and 25a in which there is recorded in advance information indicating a destination of a detected signal that is input to the input terminal (that is, a servo driver which should process the detected signal). In the information recording units 25 and 25a, the above information is recorded in advance as tables 22 and 22a, respectively. The table 22 contains a correspondence relationship indicating that a destination of the detected signal which is input to the input terminal M1 is the servo driver 2, for example. FIG. 13 shows a correspondence relationship between the input terminal M1 and the servo driver 2 as "M1-servo driver 2." Accordingly, each of the servo drivers 2 and 2a can generate the information indicating the servo driver corresponding to the destination of each detected signal (for example, the information indicating that a destination of the detected signal DET2 is the servo driver 2).

When each servo driver has received a detected signal from a sensor allocated to the servo driver, the servo driver processes the received detected signal. As an example, a destination of the detected signal DET2 is the servo driver 2. Accordingly, the servo driver 2 processes the detected signal DET2.

On the other hand, when each servo driver has received a detected signal from a sensor allocated to a servo driver different from the servo driver, the servo driver generates the information for making the different servo driver correspond to a destination, and transmits the detected signal and the information. Each of the servo drivers 2 and 2a gives the information to a detected signal, and transmits the detected signal to which the information is given, to a servo driver different from the servo driver.

That is, each of the servo drivers 2 and 2a receives the information indicating a corresponding servo driver, and a detected signal, and determines whether the servo driver should process the detected signal or transfer the detected signal to the different servo driver.

As an example, a destination of the detected signal DET3a is the servo driver 2a. Therefore, the servo driver 2 gives to the detected signal DET3a the information <servo driver 2a> that is corresponded to the destination of the detected signal DET3a. The detected signal DET3a to which the information <servo driver 2a> is given is expressed as DET3a<servo driver 2a>. The servo driver 2 transmits DET3a<servo driver 2a> to the servo driver 2a. Therefore, according to the fifth embodiment, the same effect as that of the fourth embodiment can be obtained.

A case where the information indicating the servo driver corresponding to the destination of the detected signal is given to the detected signal has been described. However, as illustrated in FIG. 10, a detected signal and the information may be transmitted continuously or may be transmitted with a time interval.

[First Modification of the Fifth Embodiment]

In the fifth embodiment, the information indicating the servo driver corresponding to the destination of the detected signal is transmitted to a different servo driver. However, the servo driver may keep holding the information.

Figure 14:
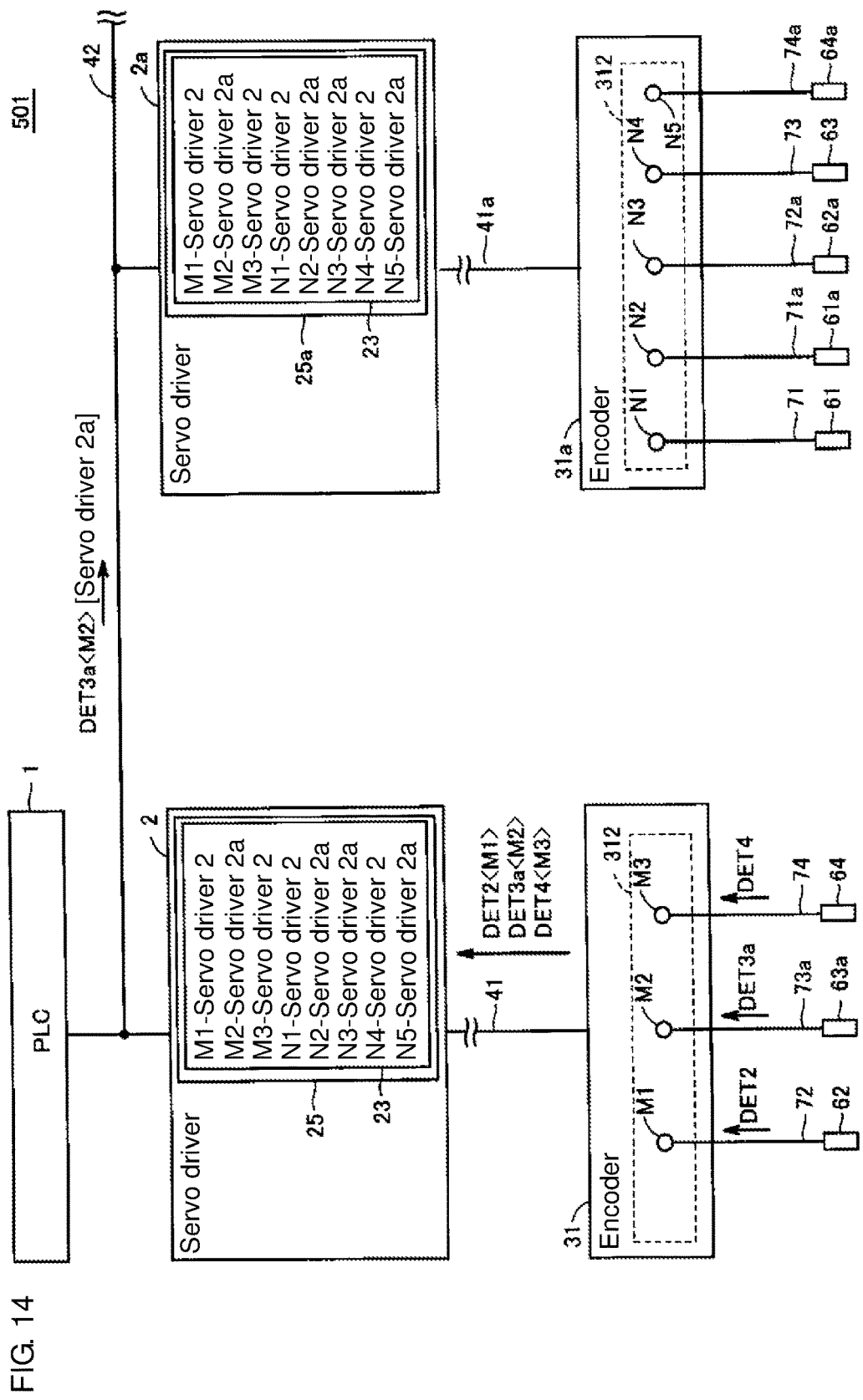
FIG. 14 illustrates structural elements relevant to sorting of detected signals in a servo system according to a first modification of the fifth embodiment.

FIG. 14 illustrates structural elements relevant to sorting of detected signals in a servo system 501 according to a first modification of the fifth embodiment. Referring to FIG. 14, in the servo system 501, the servo drivers 2 and 2a are connected in parallel to the PLC 1.

The servo drivers 2 and 2a have information recording units 25 and 25a, respectively. In the information recording units 25 and 25a, a common table 23 is recorded in advance. That is, the information recorded in the information recording unit is common between the servo drivers 2 and 2a. The table 23 contains the information indicating destinations of detected signals (that is, servo drivers that should process the detected signals), for all input terminals of the input unit 312 of the servo driver 2 and for all input terminals of the input unit 312 of the servo driver 2a. That is, the information is for specifying a destination for each detected signal. In order to avoid complexity of the drawing, FIG. 14 illustrates only the detected signals received by the encoder 31.

Each of the servo drivers 2 and 2a determines, based on the information recorded in the information recording units (25 and 25a), whether the servo driver should process the detected signal or transfer the detected signal to the different servo driver.

As an example, the information indicating input to the input terminal M2 is expressed as <M2>. The detected signal DET3a to which the information <M2> is given is expressed as DET3a<M2>. For example, the servo driver 2 receives DET3a<M2> from the encoder 31. In this case, the servo driver 2 gives to the detected signal DET3a<M2> the information <servo driver 2a> indicating that a destination of the detected signal DET3a is the servo driver 2a. The servo driver 2 transmits DET3a<M2>[servo driver 2a]. DET3a<M2>[servo driver 2a] is the detected signal DET3a<M2> to which the information [servo driver 2a] is given.

For example, each of the servo drivers 2 and 2a checks the information of a destination given to the detected signal which is transmitted through the communication cable 42. [servo driver 2a] is given to the detected signal DET3a<M2>, as the information of a destination. Therefore, the servo driver 2a can receive the detected signal DET3a<M2>[servo driver 2a]. That is, the detected signal DET3a<M2> is transferred from the servo driver 2 to the servo driver 2a.

The servo driver 2a receives the detected signal DET3a<M2>[servo driver 2a], and refers to the table 23. In the table 23, the servo driver 2a is registered in advance as a servo driver corresponding to the information <M2> given to the received detected signal DET3a. Accordingly, the servo driver 2a can determine that the servo driver 2a should process the received detected signal DET3a. Further, because other processes in the first modification of the fifth embodiment are similar to the processes in the fifth embodiment, a detailed description will not be repeated. According to the first modification of the fifth embodiment, the same effect as that of the fourth embodiment can be obtained.

[Second Modification of the Fifth Embodiment]

In the above first modification, the common table 23 is recorded in the information recording units (25 and 25a) of each servo driver. That is, the same information is held in each servo driver. However, when the information given to a transmitted detected signal is not registered in a servo driver, the servo driver can transfer the detected signal. In the case of such a configuration, when the information given to a transmitted detected signal is registered in a servo driver, the servo driver processes the detected signal.

Figure 15:
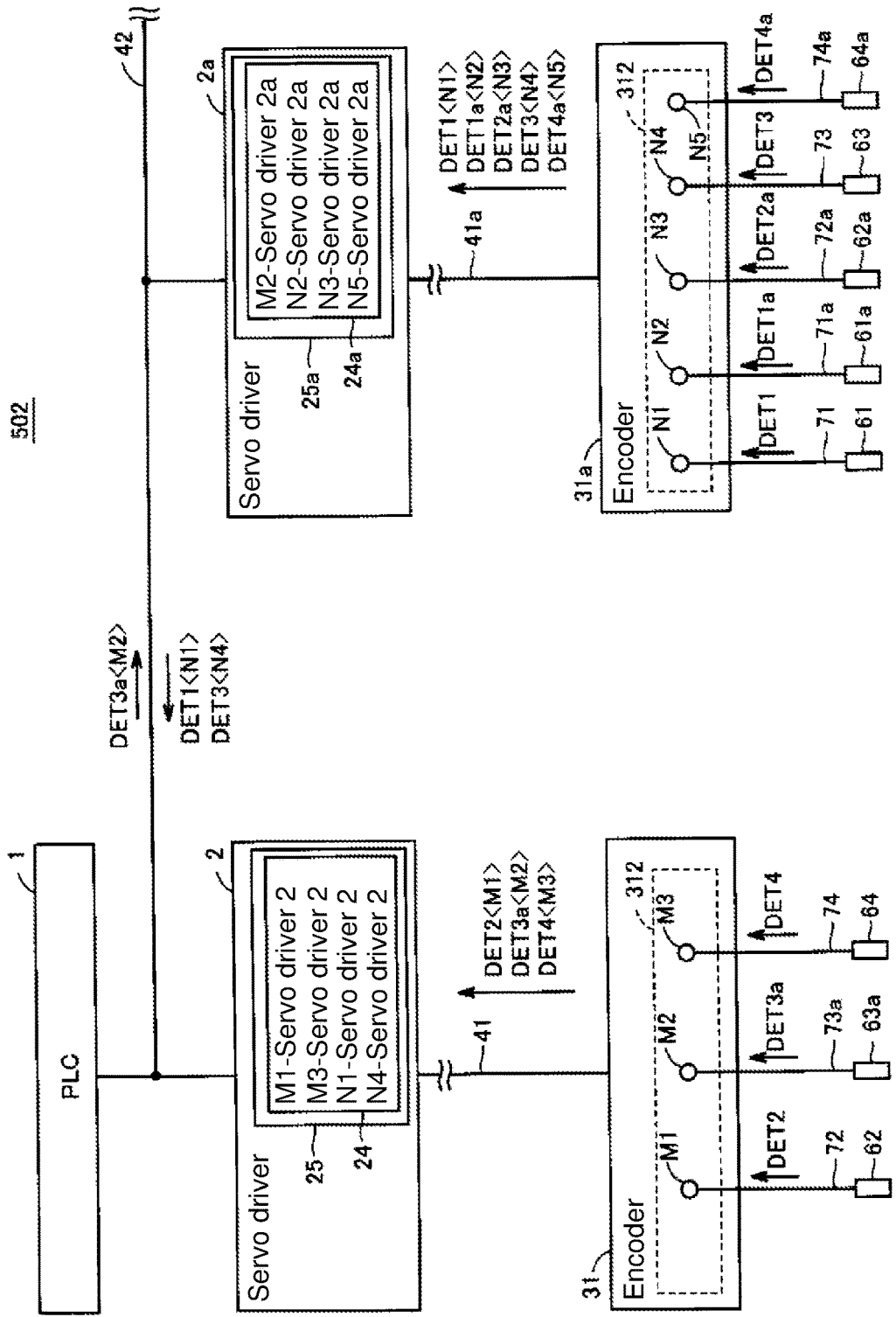
FIG. 15 illustrates structural elements relevant to sorting of detected signals in a servo system according to a second modification of the fifth embodiment.

FIG. 15 illustrates structural elements relevant to sorting of detected signals in a servo system 502 according to a second modification of the fifth embodiment. The configuration of the servo system 502 illustrated in FIG. 15 is similar to the configuration of the servo system 500 illustrated in FIG. 13. However, the content of the table recorded in the information recording unit is different from that in the configuration illustrated in FIG. 13. In the table, the information indicating that a destination of the detected signal is the servo driver is recorded.

For example, a table 24 is recorded in the information recording unit 25 of the servo driver 2. The table 24 contains the information of a terminal that is given to a detected signal of which a destination is the servo driver 2. This information indicates that a destination of the detected signal is the servo driver 2. Therefore, when the information given to the received detected signal indicates the terminals M1, M3, N1, and N4, the servo driver 2 processes the detected signal. On the other hand, when a detected signal to which the information indicating a terminal different from the above terminal (the information not corresponding to the destination indicated by the information contained in the table 24) is given has been transmitted to the servo driver 2, the servo driver 2 transfers the detected signal to the servo driver 2a. For example, the servo driver 2 receives the detected signal DET3a<M2> from the encoder 31. The information of the terminal M2 is not contained in the table 24. Therefore, the servo driver 2 transfers the detected signal DET3a<M2> to the servo driver 2a.

On the other hand, a table 24a is recorded in the information recording unit 25a of the servo driver 2a. The table 24a contains the information of a terminal that is given to a detected signal of which a destination is the servo driver 2a. That is, when the information given to the detected signal indicates the terminals M2, N2, N3, and N5, the servo driver 2a processes the detected signal. Therefore, the servo driver 2a processes the detected signal DET3a<M2> transferred from the servo driver 2. On the other hand, the servo driver 2a receives the detected signal DET1<N1> from the encoder 31a, and transfers the detected signal DET1<N1> to the servo driver 2, for example. Similarly, the servo driver 2a receives the detected signal DET3<N4> from the encoder 31a, and transfers the detected signal DET3<N4> to the servo driver 2.

Because other processes in the second modification of the fifth embodiment are similar to the processes in the fifth embodiment, a detailed description will not be repeated. According to the second modification of the fifth embodiment, the same effect as that of the fourth embodiment can be obtained.

Further, the fifth embodiment and the modifications 1 and 2 thereof can also be applied to a system of three or more servo drivers. In all cases, transfer destinations of detected signals from each servo driver are determined in one way. In the fifth embodiment and the first modification thereof, destinations of detected signals are determined in one way in the table. For example, in the second modification of the fifth embodiment, a detected signal is transferred from a certain servo driver to a different servo driver. However, when a servo driver of a transfer destination does not process the detected signal, the servo driver can transfer the detected signal to a still another servo driver (a servo driver which is determined in advance as a transfer destination).

[Sixth Embodiment]

In a sixth embodiment, the PLC generates the information indicating the servo driver corresponding to the destination of the detected signal.

Figure 16:
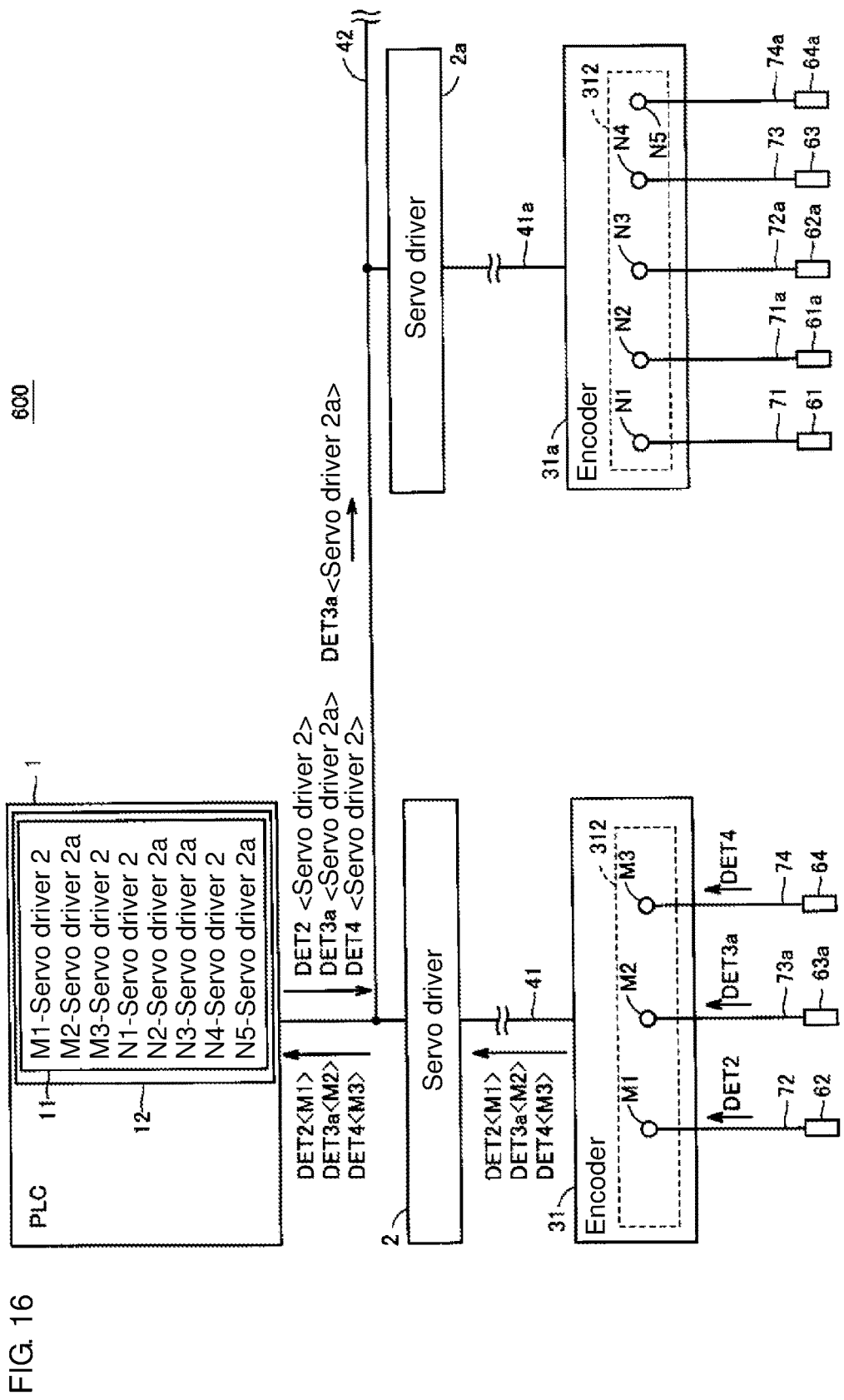
FIG. 16 illustrates structural elements relevant to sorting of detected signals in a servo system according to a sixth embodiment.

FIG. 16 illustrates structural elements relevant to sorting of detected signals in a servo system 600 according to a sixth embodiment. Because an overall configuration of the servo system 600 and a configuration of the encoders are similar to the overall configuration of the servo system 400 (refer to FIG. 9) and the configurations of the encoders 31 and 31a (refer to FIG. 13), a detailed description will not be repeated. In order to avoid complexity of the drawing, FIG. 16 illustrates only the detected signals received by the encoder 31.

Referring to FIG. 16, the PLC 1 has an Information recording unit 12 in which a table 11 is recorded in advance. The table 11 contains the information indicating destinations of detected signals, for all input terminals of the input unit 312 of the servo driver 2 and for all input terminals of the input unit 312 of the servo driver 2a. The PLC 1 generates, based on the table 11, the information indicating the servo driver corresponding to the destination of each detected signal.

As an example, the detected signal DET2 to which the information <M1> is given is expressed as DET2<M1>. The detected signal DET2 which is given the information for making the servo driver 2 correspond to a destination of the detected signal DET2 is expressed as DET2<servo driver 2>. When the servo driver 2 has received DET2<M1>, the servo driver 2 transmits DET2<M1> straight to the PLC 1. The PLC 1 generates DET2<servo driver 2>, based on the table 11, and transmits DET2<servo driver 2> to the servo driver 2. Accordingly, the servo driver 2 processes DET2<servo driver 2>.

As another example, the detected signal DET3a to which the information <M2> is given is expressed as DET3a<M2>. The detected signal DET3a which is given the information for making the servo driver 2a correspond to a destination of the detected signal DET3a is expressed as DET3a<servo driver 2a>. When the servo driver 2 has received DET3a<M2>, the servo driver 2 transmits DET3a<M2> straight to the PLC 1. The PLC 1 generates DET3a<servo driver 2a>, based on the table 11, and transmits DET3a<servo driver 2a> to the servo driver 2. Accordingly, DET3a<servo driver 2a> is transferred from the servo driver 2 to the servo driver 2a, and is processed by the servo driver 2a. According to the sixth embodiment, the same effect as that of the fourth embodiment can be obtained.

Differences in the roles of the servo drivers in the fourth to sixth embodiments will be described. In the fourth embodiment, a destination of a detected signal is determined by an encoder. Each servo driver processes or transfers the detected signal, in accordance with a destination determined by the encoder. In the fifth embodiment and the modifications thereof, each servo driver determines whether the servo driver itself should process the detected signal or transfer the detected signal. In the sixth embodiment, the PLC determines a destination of a detected signal. Each servo driver processes or transfers the detected signal, in accordance with a destination determined by the PLC.

That is, in the sixth embodiment, when each of the servo drivers 2 and 2a has received a detected signal from a sensor allocated to the servo driver, the PLC 1 controls the servo driver so that the servo driver processes the detected signal, and when each of the servo drivers 2 and 2a has received a detected signal from a sensor allocated to a servo driver different from the servo driver, the PLC 1 controls the servo driver so that the servo driver transfers the detected signal to the different servo driver.

A case where the information indicating the servo driver corresponding to the destination of the detected signal is given to the detected signal has been described. However, as illustrated in FIG. 10, a detected signal and the information may be transmitted continuously or may be transmitted with a time interval.

[Modification of the Sixth Embodiment]

While in the sixth embodiment, a mode of transmitting and receiving a detected signal between a servo driver and the PLC has been described, the servo driver does not need to transmit the detected signal to the PLC.

Figure 17:
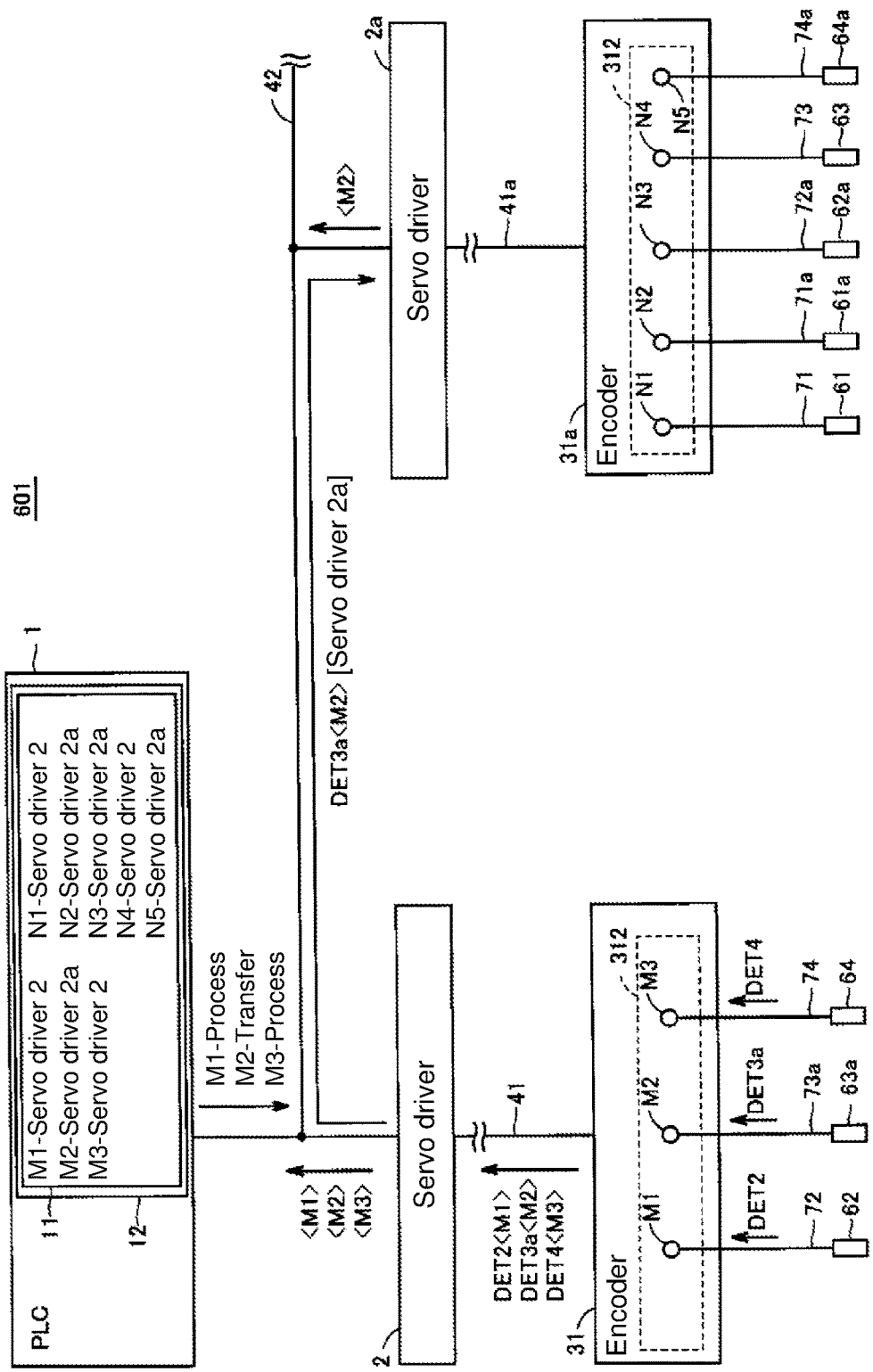
FIG. 17 illustrates structural elements relevant to sorting of detected signals in a servo system according to a modification of the sixth embodiment.

FIG. 17 illustrates structural elements relevant to sorting of detected signals in a servo system 601 according to a modification of the sixth embodiment. In order to avoid complexity of the drawing, FIG. 17 illustrates only the detected signals received by the encoder 31.

Referring to FIG. 17, in the servo system 601, the servo drivers 2 and 2a are connected in parallel to the PLC 1.

The PLC 1 has the information recording unit 12 in which the table 11 is recorded in advance. The table 11 contains the information indicating destinations of detected signals that are input to each input terminal. The PLC 1 holds the information, and determines for each servo driver, based on the held information, whether the servo driver should process the detected signal or transfer the detected signal to the different servo driver.

When the servo driver 2 has received a detected signal, the servo driver 2 asks the PLC 1 whether the servo driver 2 itself may process the detected signal. When the servo driver 2 has received DET2<M1>, for example, the servo driver 2 holds the detected signal DET2, and transmits the information <M1> to the PLC 1, instead of transmitting DET2<M1> straight to the PLC 1. According to the table 11, the servo driver 2 should process the detected signal input to the input terminal M1. Therefore, the PLC 1 notifies the servo driver 2 that the servo driver 2 should process the detected signal. The servo driver 2 processes the detected signal DET2 in accordance with the notification.

On the other hand, when the servo driver 2 has received DET3a<M2>, for example, the servo driver 2 holds the detected signal DET3a, and transmits the information <M2> to the PLC 1. According to the table 11, the servo driver 2a should process the detected signal input to the input terminal M2. Therefore, the PLC 1 notifies the servo driver 2 that the servo driver 2 should transfer the detected signal to the servo driver 2a.

In response to the notification from the PLC 1, the servo driver 2 generates the information [servo driver 2a] indicating that a destination of the detected signal DET3a<M2> is the servo driver 2a. The servo driver 2 gives the information [servo driver 2a] to the detected signal DET3a<M2>, and generates the detected signal DET3a<M2>[servo driver 2a]. Then, the servo driver 2 transmits the detected signal DET3a<M2>[servo driver 2a].

Each of the servo drivers 2 and 2a checks the information of a destination given to the detected signal transmitted through the communication cable 42. [servo driver 2a] is given to the detected signal DET3a<M2>, as the information of a destination. Therefore, the servo driver 2a can receive the detected signal DET3a<M2>[servo driver 2a]. That is, the detected signal DET3a<M2> is transferred from the servo driver 2 to the servo driver 2a.

When the servo driver 2a has received the detected signal DET3a<M2>[servo driver 2a], the servo driver 2a asks the PLC 1 whether the servo driver 2a itself may process the detected signal DET3a<M2>. The PLC 1 notifies the servo driver 2a that the servo driver 2a should process the detected signal. The servo driver 2a processes the detected signal DET3a, in accordance with the notification.

As described above, according to the modification of the sixth embodiment, the same effect as that of the fourth embodiment can be obtained.

As described in the second embodiment, at least one of the encoders 31 and 31a is connectable to an electric device (for example, lighting equipment) through a cable, and may supply power to the electric device through the cable. Further, as described in the third embodiment, at least one of the encoders 31 and 31a is connectable to an electric device (for example, an imaging device) through a cable, and may output a control signal for controlling the electric device to the electric device through the cable.

As described above, in the fourth to sixth embodiments and the modifications thereof, the number of the groups is not limited to two. For example, by increasing the number of the input units of the encoder to more than two (increasing the number of input channels), the embodiments can also be applied to a servo system having more than two groups.

Further, FIG. 9 illustrates the configuration based on the first embodiment, as a configuration of each group. However, the configuration of each group may be either one of the configuration based on the first embodiment and the configuration based on the second embodiment.

The motor and the encoder may be integrated or may be separated.

In the above embodiments, the information recording unit is installed in the device that determines a destination of a detected signal. Specifically, in the fifth embodiment (and the first and second modifications thereof), the information recording unit is provided in the servo drivers 2 and 2a. Further, in the sixth embodiment, the information recording unit is provided in the PLC 1. However, the information recording unit has only to be provided in the servo system. Therefore, the information recording unit may be provided independently of the PLC or the servo driver. That is, the information recording unit may be provided in any portion of the servo system.

It should be understood that the embodiments disclosed herein are examples in all aspects and are not limiting. The scope of the present invention is not indicated by the above description but by the claims, and is intended to include all changes within the meaning and the scope equivalent to the claims.

DESCRIPTION OF SYMBOLS

1 PLC
2, 2a Servo driver
3 Servo motor
11, 22, 22a, 23 Table
12, 25, 25a Information recording unit
30 Motor
301 Rotation axis
31 to 33, 31a, 39 Encoder
311 Signal generator
312, 312a Input unit
313 A/D converter
21, 314 Communication unit
314a Communication controller
325 Output unit
40 Power supply cable
41 Encoder cable
42 Communication cable
51, 51a Coupling
52, 52a Threaded shaft
53, 53a Precision stage
54, 54a Linear scale
541 Slit
411 Power supply line
412 Ground line
413 to 417 Data transmission line
61, 61a Origin sensor
62, 62a, 63, 63a Limit sensor
64, 64a Full-closed sensor
8 Workpiece
81 Lighting equipment
82 Imaging device
71 to 74, 71a to 74a, 91, 92 Cable
92a Power line
92b Control line
92c Data line
100, 200, 300, 400, 500, 501, 502, 600, 601, 900 Servo system
T1 to T4, T3a, T3b, T4a, T4b Terminal
T5, T5a Power terminal
T6 Control terminal
T7 Data input terminal
M1 to M3, N1 to N5 Input terminal

The invention claimed is:

1. An encoder that detects an operation of a motor that drives an object, the encoder, the motor and the object located in a first location, the encoder comprising:
   a signal generator configured to:
      detect, via a cable connected to the motor, the operation of the motor driven by a servo driver located in a second location remote from the first location; and
      generate a feedback signal indicating the detected operation of the motor;
   an input unit comprising a cable terminal that connects a plurality of sensor cables coupled to a plurality of sensors arranged near the motor and the object, the input unit configured to receive, via the plurality of sensor cables, a respective plurality of detected signals output from a respective plurality of sensors, which detect aspects of the object driven by the motor; and
   a communication unit configured to:
      receive the feedback signal from the signal generator;
      receive the respective plurality of detected signals from the input unit; and
      output, using a single common encoder cable, to the servo driver in the second location, a digital signal encoding data comprising:
         the feedback signal; and
         the respective plurality of detected signals, wherein
   the servo driver is configured to:
      receive the digital signal; and
      provide a drive current to the motor based on the digital signal.

2. The encoder according to claim 1, further comprising a power terminal configured to be connected to an electric device through a cable, and to supply power to the electric device through the cable.

3. The encoder according to claim 1, further comprising a control terminal configured to be connected to an electric device through a cable, and to output a control signal for controlling the electric device to the electric device through the cable.

4. The encoder according to claim 1, wherein
the encoder has an operation mode in which a plurality of servo drivers can communicate with each other, and
the communication unit is configured to transmit, in the operation mode, information indicating a servo driver corresponding to a destination of the detected signal.

5. A servo system comprising:
the encoder according to claim 1;
the motor;
the servo driver for driving the motor;
the plurality of sensors that detect one or more of: an operation condition of the motor; and aspects of the object driven by the motor; and
the plurality of sensor cables that transmit to the encoder the respective plurality of detected signals output from the respective plurality of sensors.

* * * * *